United States Patent
Alva et al.

(10) Patent No.: US 11,543,857 B2
(45) Date of Patent: Jan. 3, 2023

(54) DISPLAY ADJUSTMENT

(71) Applicant: Intel Corporation, Santa Clara, CA (US)

(72) Inventors: Samarth Alva, Bangalore (IN); Krishnakumar Varadarajan, Bangalore (IN); Sean Jude William Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 570 days.

(21) Appl. No.: 16/236,438

(22) Filed: Dec. 29, 2018

(65) Prior Publication Data

US 2019/0138054 A1 May 9, 2019

(51) Int. Cl.
*G06F 1/16* (2006.01)
*G06F 3/01* (2006.01)
*G05B 19/042* (2006.01)

(52) U.S. Cl.
CPC ......... *G06F 1/1637* (2013.01); *G05B 19/042* (2013.01); *G06F 1/1616* (2013.01); *G06F 1/1681* (2013.01); *G06F 3/013* (2013.01); *G05B 2219/21109* (2013.01); *G05B 2219/25425* (2013.01)

(58) Field of Classification Search
CPC .... G06F 1/1637; G06F 1/1616; G06F 1/1681; G06F 3/013; G05B 19/042; G05B 2219/21109; G05B 2219/254425
See application file for complete search history.

(56) References Cited

U.S. PATENT DOCUMENTS

| | | | | |
|---|---|---|---|---|
| 6,690,337 B1* | 2/2004 | Mayer, III | ............ | G06F 1/1601 345/1.1 |
| 6,996,460 B1* | 2/2006 | Krahnstoever | ......... | G06F 3/011 701/1 |
| 7,103,460 B1* | 9/2006 | Breed | ................ | B60C 23/0408 701/29.1 |
| 7,126,583 B1* | 10/2006 | Breed | .................... | B60K 35/00 345/158 |
| 7,164,117 B2* | 1/2007 | Breed | ............... | B60R 21/01516 250/208.1 |
| 7,439,956 B1* | 10/2008 | Albouyeh | ............ | G06F 1/1601 345/168 |
| 8,371,442 B1* | 2/2013 | Pack | ...................... | A45C 11/00 206/320 |

(Continued)

OTHER PUBLICATIONS

Provincial Health Services Authority, "Monitor Positioning", published on Mar. 1, 2018 at http://www.phsa.ca/staff-resources-site/Documents/COVID-19-staff/monitor-positioning.pdf, retrieved Jan. 11, 2022. (Year: 2018).*

(Continued)

*Primary Examiner* — Shourjo Dasgupta
(74) *Attorney, Agent, or Firm* — Patent Capital Group

(57) ABSTRACT

Particular embodiments described herein provide for an electronic device that can be configured to receive data related to a gaze of a user, determine that a display should be adjusted based on the received data related to the gaze of the user, and activate a motor, where the motor causes the height of the display to be adjusted. In an example, the electronic device can also determine that the display should be rotated based on the received data related to the gaze of the user and rotate the display.

18 Claims, 19 Drawing Sheets

(56) References Cited

U.S. PATENT DOCUMENTS

| | | | | |
|---|---|---|---|---|
| 9,794,516 B1* | 10/2017 | Tuli | | H04N 21/42204 |
| 10,181,154 B1* | 1/2019 | Budde | | G06Q 40/00 |
| 10,231,662 B1* | 3/2019 | Berme | | G01L 5/1627 |
| 2004/0228077 A1* | 11/2004 | Hall | | G06F 1/1601 |
| | | | | 361/679.25 |
| 2005/0046584 A1* | 3/2005 | Breed | | B60N 2/0232 |
| | | | | 340/13.31 |
| 2005/0192727 A1* | 9/2005 | Shostak | | B60C 11/24 |
| | | | | 701/37 |
| 2005/0273218 A1* | 12/2005 | Breed | | B60R 21/20 |
| | | | | 701/2 |
| 2006/0025897 A1* | 2/2006 | Shostak | | G08G 1/017 |
| | | | | 701/1 |
| 2006/0152893 A1* | 7/2006 | Chen | | G06F 1/1616 |
| | | | | 361/679.06 |
| 2006/0208169 A1* | 9/2006 | Breed | | G06K 9/00624 |
| | | | | 250/221 |
| 2007/0159784 A1* | 7/2007 | Chen | | G06F 1/1654 |
| | | | | 361/679.27 |
| 2008/0137273 A1* | 6/2008 | Li | | G06F 1/1601 |
| | | | | 361/679.05 |
| 2012/0212510 A1* | 8/2012 | Hewitt | | G06T 11/00 |
| | | | | 345/650 |
| 2014/0071159 A1* | 3/2014 | Ye | | G09G 3/003 |
| | | | | 345/619 |
| 2014/0267006 A1* | 9/2014 | Raffa | | G06F 1/1626 |
| | | | | 345/156 |
| 2015/0205327 A1* | 7/2015 | Daley, III | | G06F 1/1698 |
| | | | | 361/679.03 |
| 2016/0059122 A1* | 3/2016 | Ehara | | A63F 13/92 |
| | | | | 463/31 |
| 2016/0059128 A1* | 3/2016 | Ito | | A63F 13/52 |
| | | | | 463/32 |
| 2016/0112667 A1* | 4/2016 | Park | | H04N 21/426 |
| | | | | 348/739 |
| 2018/0129197 A1* | 5/2018 | Wikander | | G05B 24/02 |
| 2018/0253143 A1* | 9/2018 | Saleem | | G09G 5/003 |
| 2018/0330535 A1* | 11/2018 | Hawthorne | | G06F 3/1446 |
| 2019/0152319 A1* | 5/2019 | Wan | | B60K 35/00 |
| 2020/0050345 A1* | 2/2020 | Mugura | | G06F 3/14 |

OTHER PUBLICATIONS

Gene Kay, "Eye Strain, Neck Pain and Monitor Ergonomics (Conventional Wisdom vs Ergonomics Evidence)", published on Jul. 25, 2017 at https://www.ergobuyer.com/blog/eye-strain-neck-pain-and-monitor-ergonomics-conventional-wisdom-vs-ergonomics-evidence/, retrieved Jan. 11, 2022. (Year: 2017).*

* cited by examiner

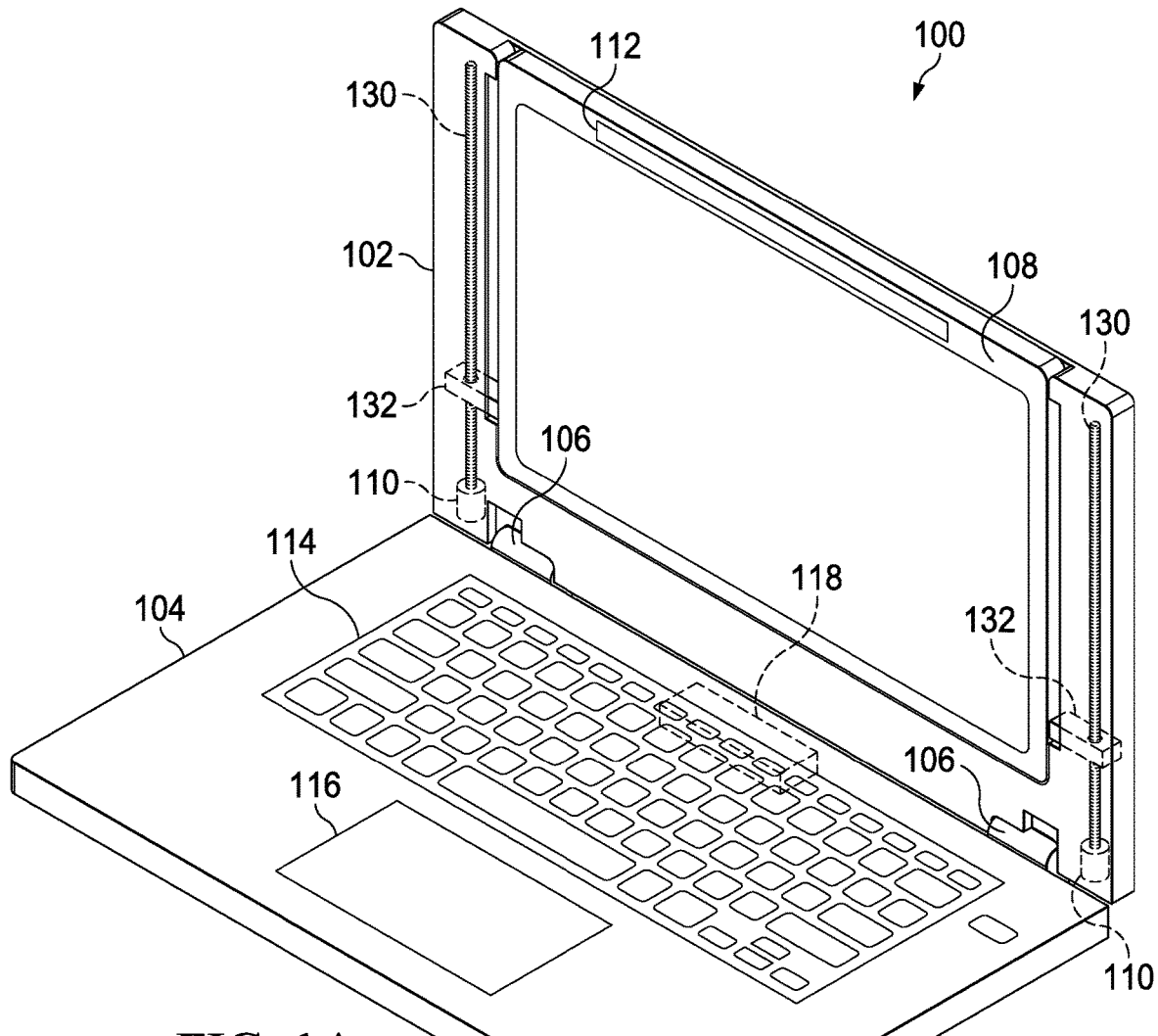
FIG. 1A
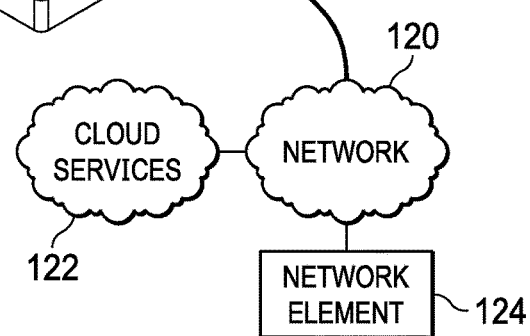

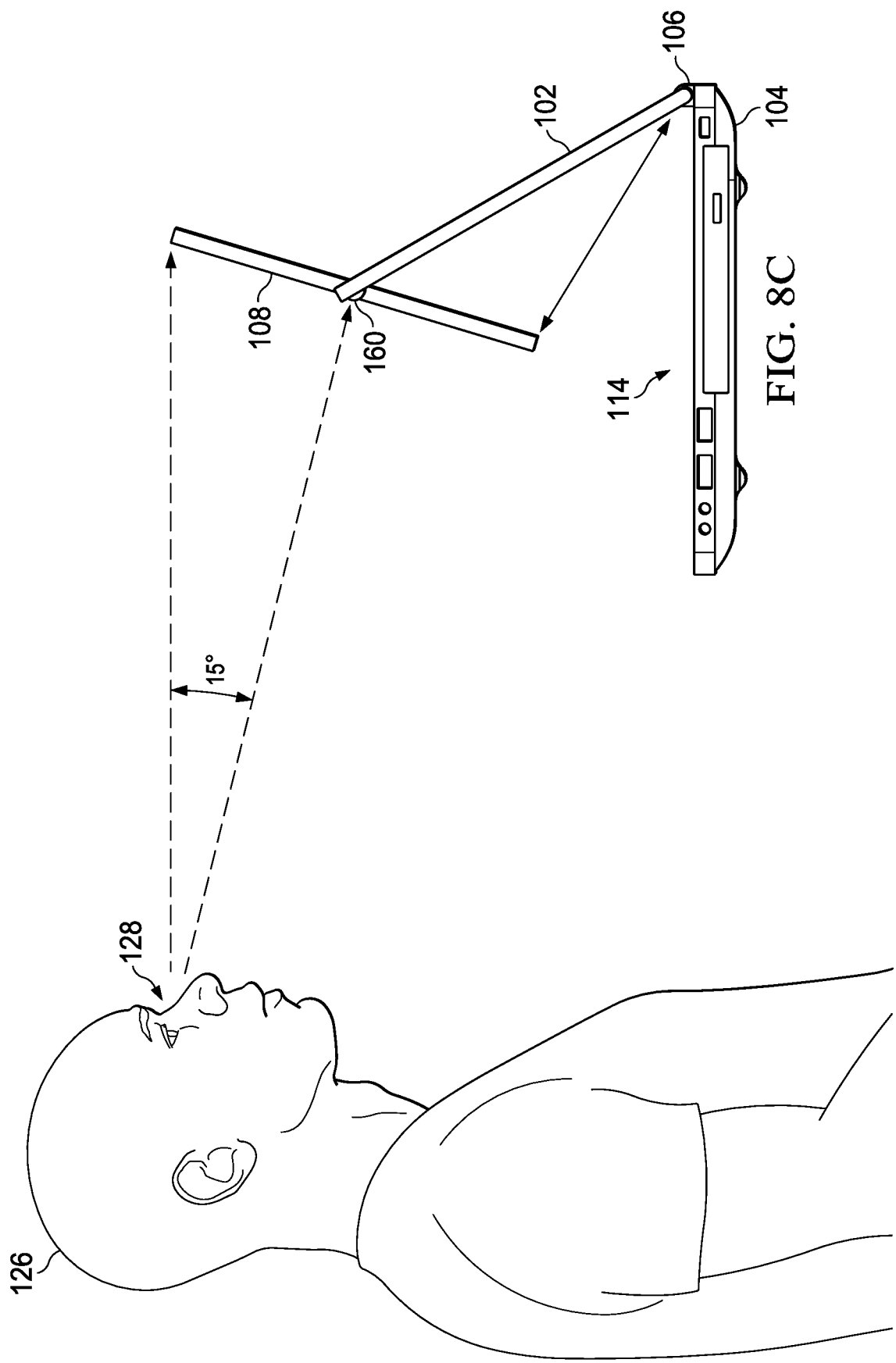

DISPLAY ADJUSTMENT

TECHNICAL FIELD

This disclosure relates in general to the field of computing, and more particularly, to a display adjustment system.

BACKGROUND

End users have more electronic device choices than ever before. A number of prominent technological trends are currently afoot and these trends are changing the electronic device landscape. Some of the technological trends involve clamshell devices. Generally, clamshell devices are devices where a first housing is rotatably coupled to a second housing. For example, a laptop, notebook computer, etc., is a small, portable personal computer with a clamshell form factor typically having, a computer display mounted on the inside of an upper first housing of the clamshell and an alphanumeric keyboard on the inside of a lower second housing of the clamshell. The clamshell device is opened to use the device and folded shut for transportation or storage.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1A is a simplified block diagram of a system to enable a display adjustment system, in accordance with an embodiment of the present disclosure;

FIG. 8C is a simplified block diagram of a portion of a system to enable a display adjustment system, in accordance with an embodiment of the present disclosure.

Figure 1B:
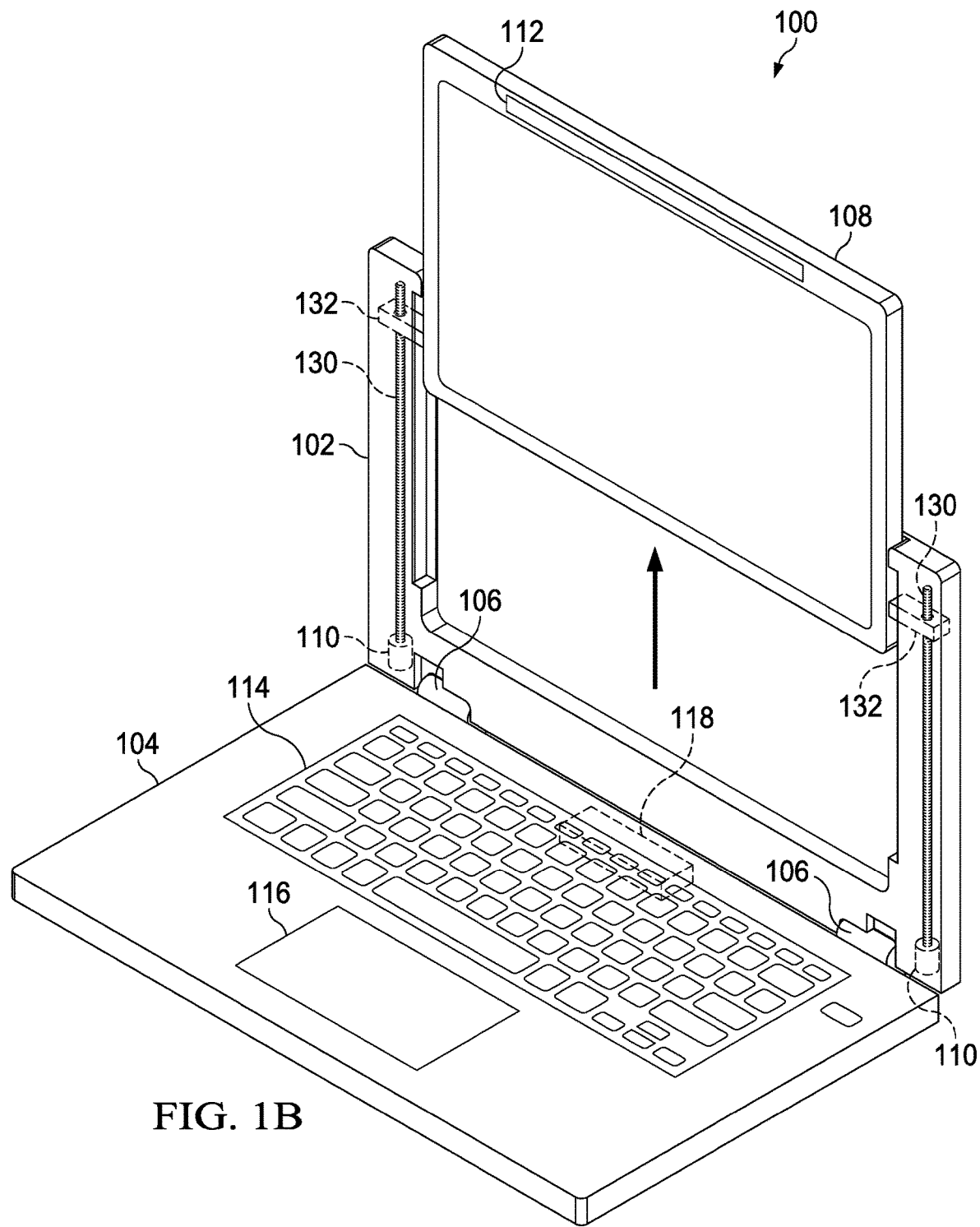
FIG. 1B is a simplified block diagram of a system to enable a display adjustment system, in accordance with an embodiment of the present disclosure.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling a display adjustment system in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. The term "coupled" may mean one or more of the following. The term "coupled" may mean that two or more elements are in direct physical or electrical contact. However, the term "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

FIG. 1A is a simplified block diagram of an electronic device configured to enable a display adjustment system, in accordance with an embodiment of the present disclosure. In an example, electronic device 100 can include a first housing 102 and a second housing 104. First housing 102 can be rotatably coupled to second housing 104 using hinge 106. First housing 102 can include a display 108, one or more instances of a motor 110, a user tracking engine 112, one of more instances of a worm gear 130, and one of more instances of a display support 132. Second housing 104 can include a keyboard 114, a touchpad 116, and a display adjustment engine 118. In an example, display adjustment engine 118 may be located in first housing 102. Electronic device 100 may be in communication with cloud services 122 and/or network element 124 using network 120.

User tracking engine 112 can be configured to track an eye or eyes, face, head position, and/or other features of a user and determine a gaze of the user. The term "gaze" refers to a relative distance of the user's face and eyes from display 108, a position of the eyes relative to display 108, a pupil orientation relative to display 108, and/or a position of the head of the user relative to display 108. User tracking engine 112 can detect the user's eyes, face, head position, and/or other features of the user, and based on the detected user's eyes, face, head position, and/or other features, user tracking engine 112 can determine the gaze of the user. More specifically, cameras, infrared (IR) sensors, and/or eye tracking systems can be used to monitor and measure the eye pupil of the user and/or the face angle of the user and use the information to determine the gaze of the user. Also, the distance of the user's face and eyes from display 108 may be determined from distance estimation using IR based 3D cameras.

Additionally, with machine learning (ML), over time electronic device 100 may be able to determine the user's gaze with red, green, blue (RGB) cameras. More specifically, the estimate height of the user's face with respect to display 108 can be determined using RGB cameras. The estimated distance of user's hands from keyboard 114 can be determined using capacitive or IR sensors to detect an approach of the user's hands. The user's posture may be determined with corresponding arm positioning using RGB camera techniques assisted with ML. User tracking engine 112 can communicate data about the gaze (i.e., relative distance of the user's eyes, face, head position, etc. from display 108) of the user to display adjustment engine 118.

Display adjustment engine 118 can be configured to receive the data about the gaze of the user from user tracking engine 112 and determine if display 108 should be raised or lowered. If display 108 should be raised or lowered, then display adjustment engine 118 can activate motor 110 to rotate worm gear 130. The rotation of worm gear 130 causes display support 132 to travel up or down worm gear 130. Display support 132 is coupled to display 108 and as display support 132 moves up or down worm gear 130, display 108 can correspondingly be raised or lowered.

Turning to FIG. 1B, FIG. 1B illustrates where display adjustment engine 118 activated motor 110 to raise display 108. In an example, display adjustment engine 118 determined that display 108 should be raised from the position illustrated in FIG. 1A to the position illustrated in FIG. 1B. Display adjustment engine 118 can activate motor 110 to rotate worm gear 130 in a first rotational direction. The rotation of worm gear 130 in the first rotational direction causes display support 132 to travel up worm gear 130. As display support 132 moves up worm gear 130, display 108, coupled to display support 132, can correspondingly be raised to the position illustrated in FIG. 1B.

Figure 1C:
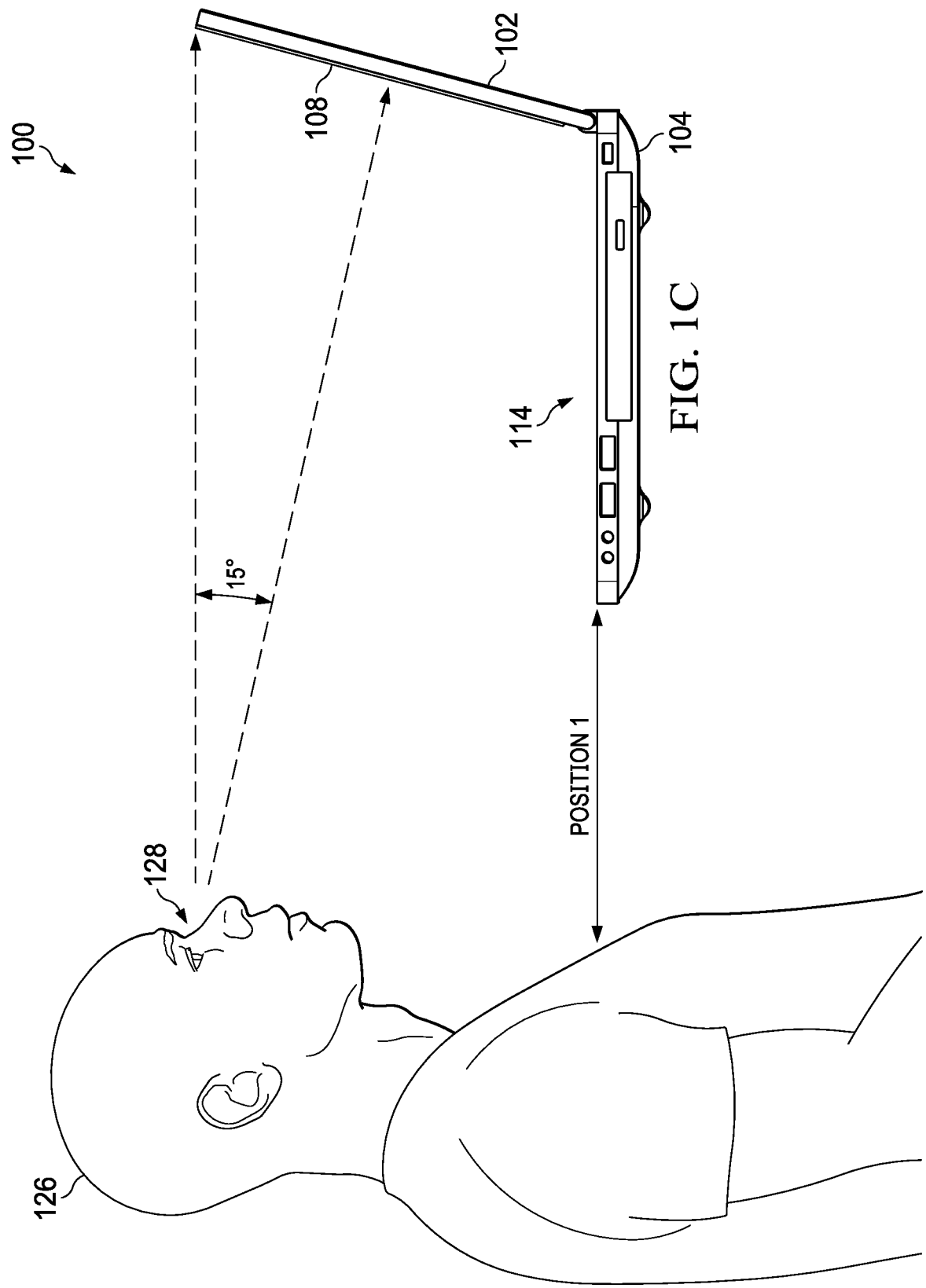
FIG. 1C is a simplified block diagram of a system to enable a display adjustment system, in accordance with an embodiment of the present disclosure.

Turning to FIG. 1C, FIG. 1C illustrates a position of electronic device 100 where display 108 is positioned at a distance and position where the gaze is ergonomic to a user 126. Generally, an ergonomic distance and position of display 108 is where a gaze of user 126 (as it relates to eyes 128 of user 126) has about a fifteen-degree focal length to display 108. However, second housing 104 and keyboard 114 are not ergonomic to user 126 as second housing 104 and keyboard 114 are too high for user 126.

Figure 1D:
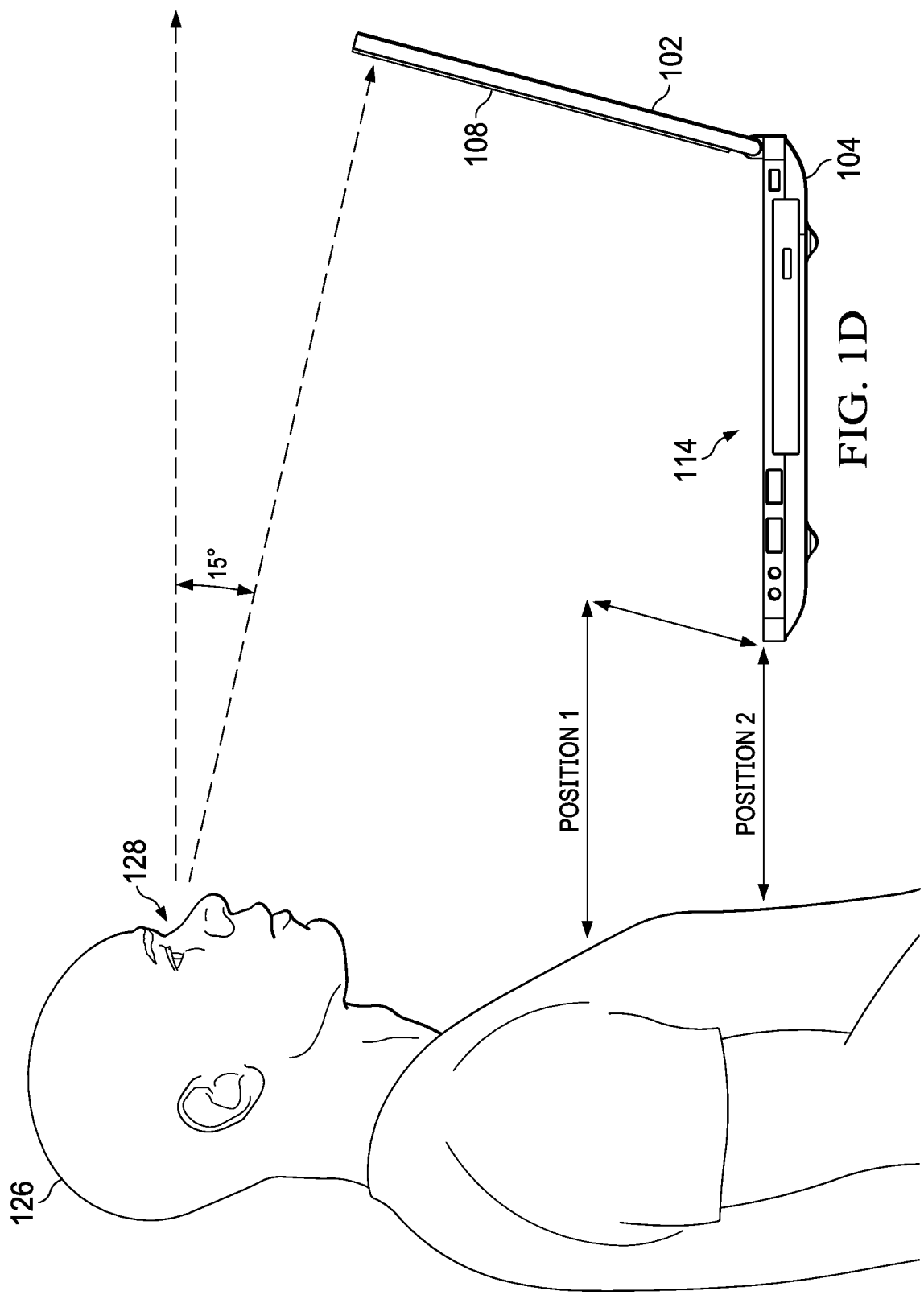
FIG. 1D is a simplified block diagram of a system to enable a display adjustment system, in accordance with an embodiment of the present disclosure.

Turning to FIG. 1D, FIG. 1D illustrates a position of electronic device 100 where second housing 104 and keyboard 114 are positioned at a distance and position that is ergonomic to user 126. However, display 108 is not ergonomic to user 126 as display 108 is too low for the user and the gaze of user 126 is not at about a fifteen-degree focal length to display 108. For example, as illustrated in FIG. 1D, the gaze of user 126 to display 108 is outside the ergonomic zone (e.g., a fifteen-degree focal length to display 108).

Figure 1E:
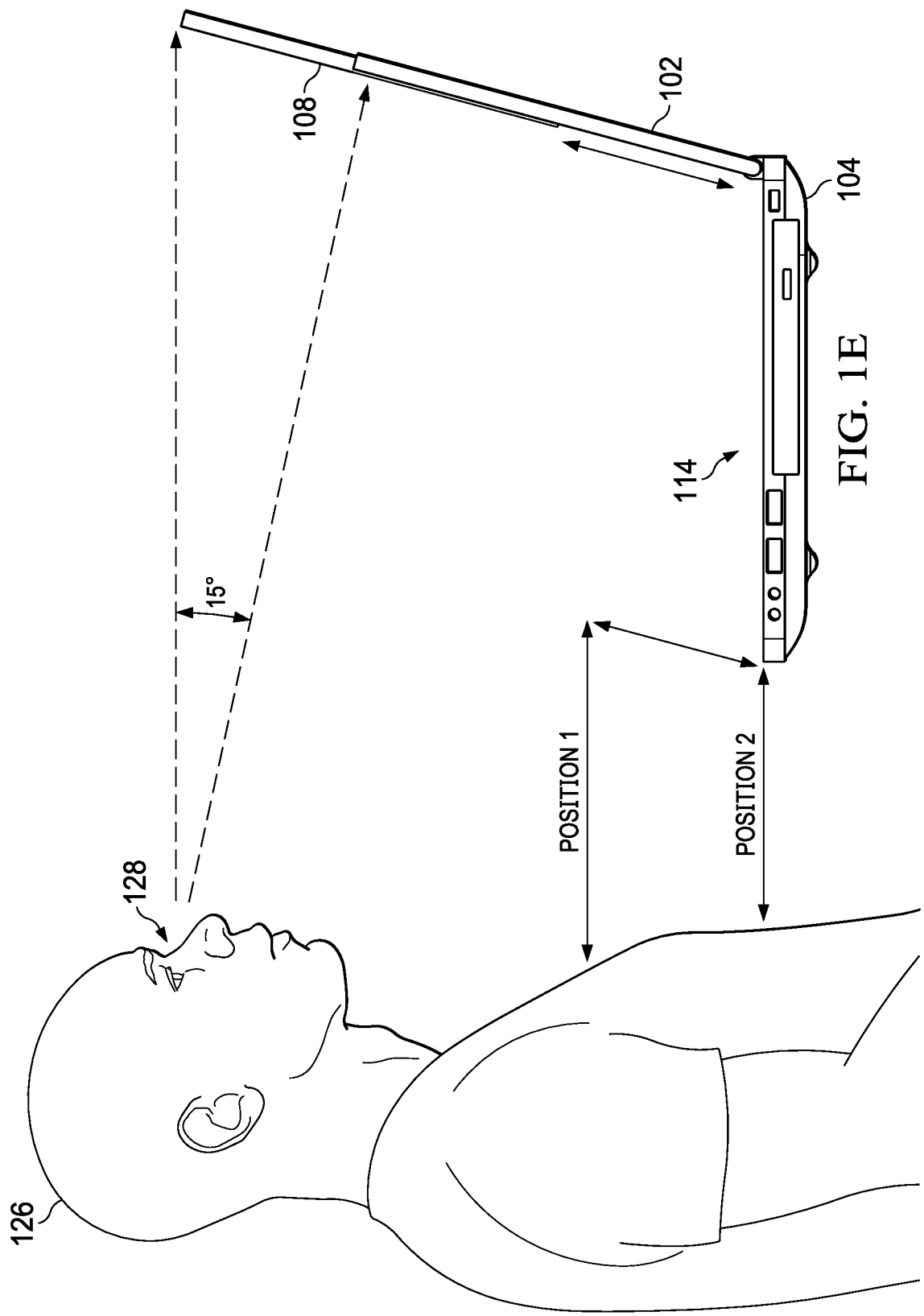
FIG. 1E is a simplified block diagram of a system to enable a display adjustment system, in accordance with an embodiment of the present disclosure.

Turning to FIG. 1E, FIG. 1E illustrates a position of electronic device 100 where second housing 104 and keyboard 114 are positioned at a distance and position ergonomic to user 126. In addition, display 108 has been raised (as illustrated in FIG. 1B) such that display 108 is positioned at a distance and position where the gaze of user 126 is more ergonomic to user 126. More specifically, user tracking engine 112 (illustrated in FIG. 1A) can be configured to determine the gaze of user 126. User tracking engine 112 can communicate data about the gaze of user 126 to display adjustment engine 118 (illustrated in FIG. 1A). Display adjustment engine 118 can be configured to receive the data about the gaze of user 126 from user tracking engine 112 and determine that display 108 should be raised from the position illustrated in FIG. 1D to the position illustrated in FIG. 1E. Display adjustment engine 118 can activate motor 110 (illustrated in FIG. 1A) to rotate worm gear 130 (illustrated in FIG. 1A) in a first rotational direction. The rotation of worm gear 130 in the first rotational direction can cause display support 132 (illustrated in FIG. 1A) to travel up worm gear 130. As display support 132 moves up worm gear 130, display 108 can correspondingly be raised to the ergonomic position illustrated in FIG. 1E.

It is to be understood that other embodiments may be utilized and structural changes may be made without departing from the scope of the present disclosure. Substantial flexibility is provided by electronic device 100 in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

Elements of FIG. 1A may be coupled to one another through one or more interfaces employing any suitable connections (wired or wireless), which provide viable pathways for network (e.g., network 120, etc.) communications. Additionally, any one or more of these elements of FIG. 1A may be combined or removed from the architecture based on particular configuration needs. Network 120 may include a configuration capable of transmission control protocol/Internet protocol (TCP/IP) communications for the transmission or reception of packets in a network. Electronic device 100 may also operate in conjunction with a user datagram protocol/IP (UDP/IP) or any other suitable protocol where appropriate and based on particular needs.

For purposes of illustrating certain example techniques of electronic device 100, the following foundational information may be viewed as a basis from which the present disclosure may be properly explained. Generally, clamshell devices are devices where a first housing is rotatably coupled to a second housing. For example, a clamshell device can be a laptop, notebook computer or other a small, portable personal computer with a clamshell form factor typically having a computer display mounted on the inside of an upper first housing of the clamshell and an alphanumeric keyboard on the inside of a lower second housing of the clamshell. The clamshell is opened to use the device and folded shut for transportation or storage.

It is commonly understood that current clamshell devices (e.g., laptops) are ergonomically flawed because the display is at a fixed height relative to the keyboard. The fixed height of the display can pose severe posture and ergonomic related problems to the user from prolonged usage, especially for mobile gamers that play their games on a clamshell device. Because clamshell devices are ergonomically flawed, some solutions elevate the clamshell device to align with the user's eyes to try and provide some ergonomic relief. However, the solutions that elevate the clamshell device only address positioning the display at a suitable eye level which is not sufficient for ergonomic positioning as the keyboard in the second housing can be too high. In addition, the solutions that elevate the clamshell device do not address the orientation between the user's eyes and the plane of the display or ergonomic positioning (distance and orientation) between the keyboard and the display.

Currently, there are no existing solutions that can automatically detect the ergonomic state of the user and adjust the display of a device to improve the ergonomics of the device. Some existing solutions require a user to manually adjust the location of the display. Also, in most cases, existing solutions are achieved through separate stand designs sold as accessories. As these are not integrated solutions, the value of many existing solutions is lost on a portable device such as a laptop, notebook computer, or other clamshell device. What is needed is a system and method to allow for a display adjustment system.

A device to help facilitate a display adjustment system, as outlined in FIGS. 1A-1E, can resolve these issues (and others). In an example, an electronic device (e.g., electronic device 100) can include a display adjustment system that can adjust the display height based on a gaze of the user (e.g., the relative distance of the user's face and eyes from the display, the position of the eyes relative to the display, the pupil orientation relative to the display, and/or the position of the head of the user relative to the display) for improved ergonomics. In some examples, the adjustment of the display height based on the user's gaze may be automatic and performed without requiring the user to manually adjust the height of the display. More specifically, cameras, IR sensors, and/or eye tracking systems can be used to monitor and measure the eye pupil of a user and/or the face angle of the user and use the information to automatically adjust the display height based on user's gaze for improved ergonomics. Ergonomic positioning of the display for a user can allow the user to use clamshell form factors with greater convenience and comfort.

In an illustrative example, when a user is in front of electronic device 100, user tracking engine 112 (e.g., a camera, IR sensors, and/or eye tracking system) can be configured to detect, determine, and monitor the gaze of the user. The data regarding the gaze of the user is used to help adjust the display vertically, for example, to a level that is within ergonomic guidelines. In an embodiment, a user controlled adjustment mechanism can provide finer granular movements to dynamically adjust the display height. In another embodiment, a configuration that allows for rotation of the screen can allow additional movement that allows additional positioning of the display with respect to the keyboard and the user. More specifically, automatic ergonomic positioning of the display can be done using forwards and backwards inclination with the display rotating about a display rotation mechanism.

A variety of mechanisms can help ensure connectivity between the second housing and the display in the first housing. For example, a display cable anti-pinch mechanism, concentric slider power pins combined with a wireless display, auto adjust guides to prevent cable slackness, or some other means may be used help ensure connectivity between the second housing and the display. In one example, a cable, wire, wire cable, etc. from the second housing can be routed through an idler pulley or spool in the first housing before being connected to the display. The idler pulley or spool can be rotated in a clockwise or anticlockwise direction in conjunction with the display being raised or lowered. In another example, a cable, wire, wire cable, etc. from the second housing can be extended across two rollers in the first housing. One roller can be a fixed roller and the second roller can be connected to the display and move with the display across various heights as the display is raised or lowered.

In yet another example, spring contacts can be used to help ensure connectivity between the second housing and the display in the first housing. More specifically, a vertical printed circuit board (PCB) or flexible printed circuit (FPC) with tracks can be mounted onto a frame of the first housing. The spring contacts can be connected to the display and slide across the PCB or FPC tracks to maintain electrical contact across various heights as the display is raised or lowered.

Turning to the infrastructure of FIG. 1A, network 120 represents a series of points or nodes of interconnected communication paths for receiving and transmitting packets of information. Network 120 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In network 120, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

In an example implementation, electronic device 100, is meant to encompass a computer that has a clamshell form factor, a laptop or electronic notebook, network elements that have a clamshell form factor, or any other device, component, element, or object that has a clamshell form factor, design, profile, etc. Electronic device 100 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic device 100 may include virtual elements.

In regards to the internal structure, electronic device 100 can include memory elements for storing information to be used in the operations outlined herein. Electronic device 100 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, electronic device 100 may include software modules (e.g., user tracking engine 112, display adjustment engine 118, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic device 100 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2:
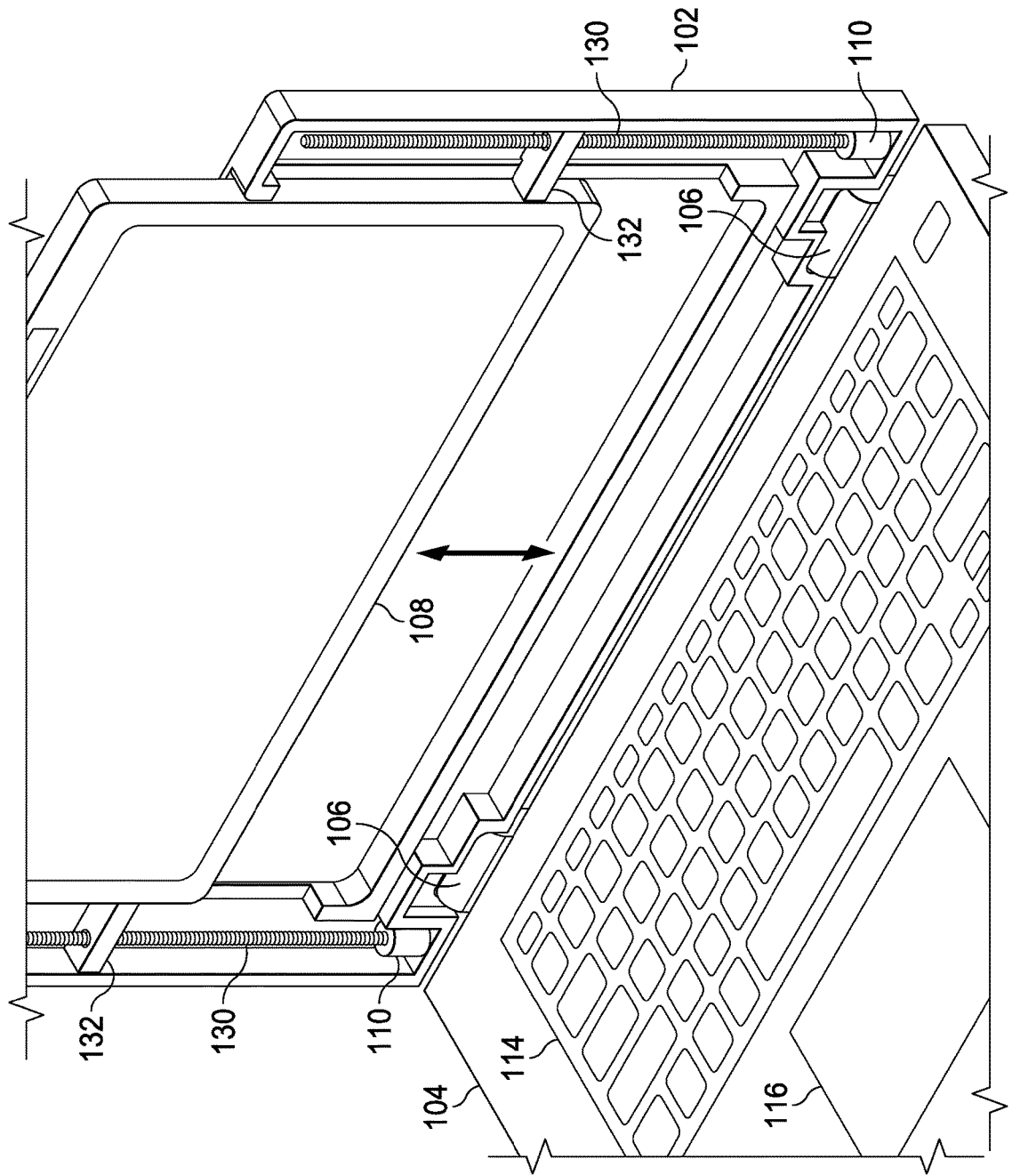
FIG. 2 is a simplified block diagram of a portion of a system to enable a display adjustment system, in accordance with an embodiment of the present disclosure.

Turning to FIG. 2, FIG. 2 is a simplified block diagram of electronic device 100 configured to include a display adjustment system. In an example, first housing 102 can include display 108, motor 110, worm gear 130, and display support 132. To move display 108 up and down, motor 110 can cause worm gear 130 to turn in a first direction or in an opposite second direction. For example, if motor 110 causes worm gear 130 to turn in the first direction, then display 108 raises up and if motor 110 causes worm gear 130 to turn in the opposite second direction, then display 108 is lowered.

Figure 3:
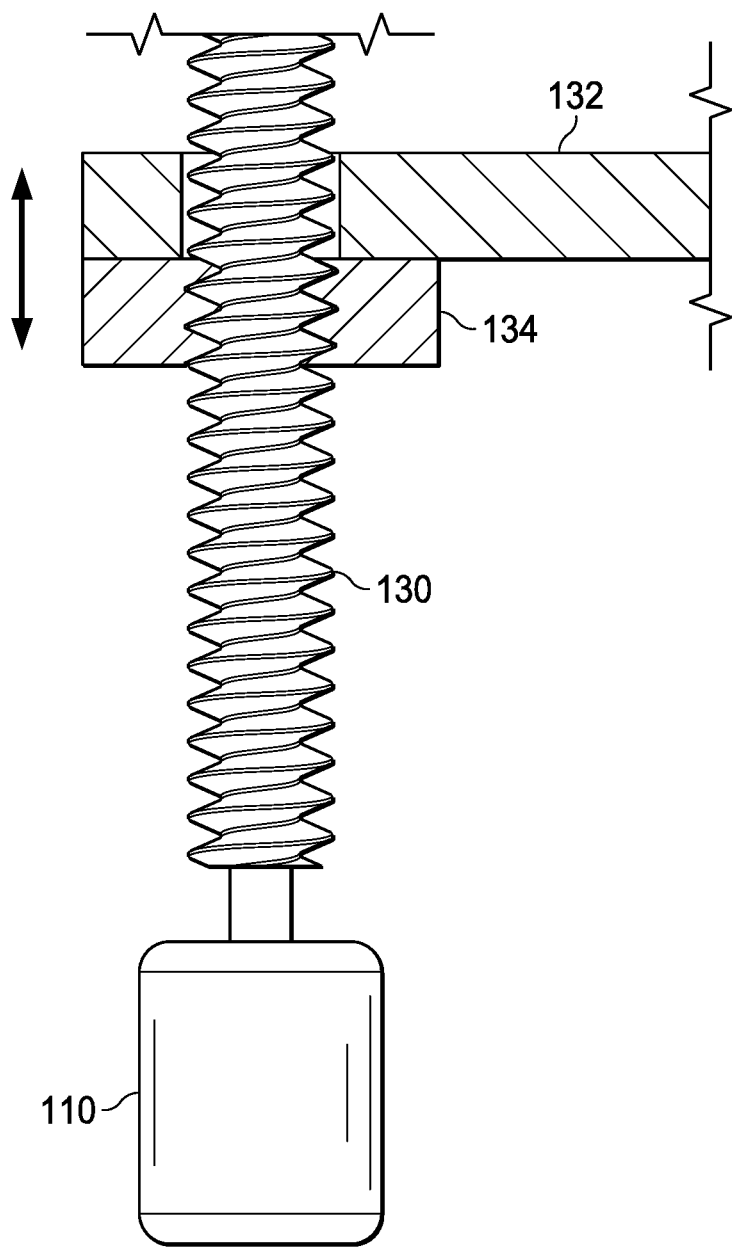
FIG. 3 is a simplified block diagram of a portion of a system to enable a display adjustment system, in accordance with an embodiment of the present disclosure.

Turning to FIG. 3, FIG. 3 is a simplified block diagram of a portion of electronic device 100 configured to include a display adjustment system. In an example, display support 132 can be secured to worm block 134. Worm block 134 can have a mating profile with worm gear 130 and be in direct contact with worm gear 130. As worm gear 130 is rotated in a first direction, worm block 134 travels up the teeth of worm gear 130 and raises display support 132, which in turn raises display 108. In addition, as worm gear 130 is rotated in a second direction, that is opposite the first direction, worm block 134 travels down the teeth of worm gear 130 and lowers display support 132, which in turn lowers display 108.

Figure 4A:
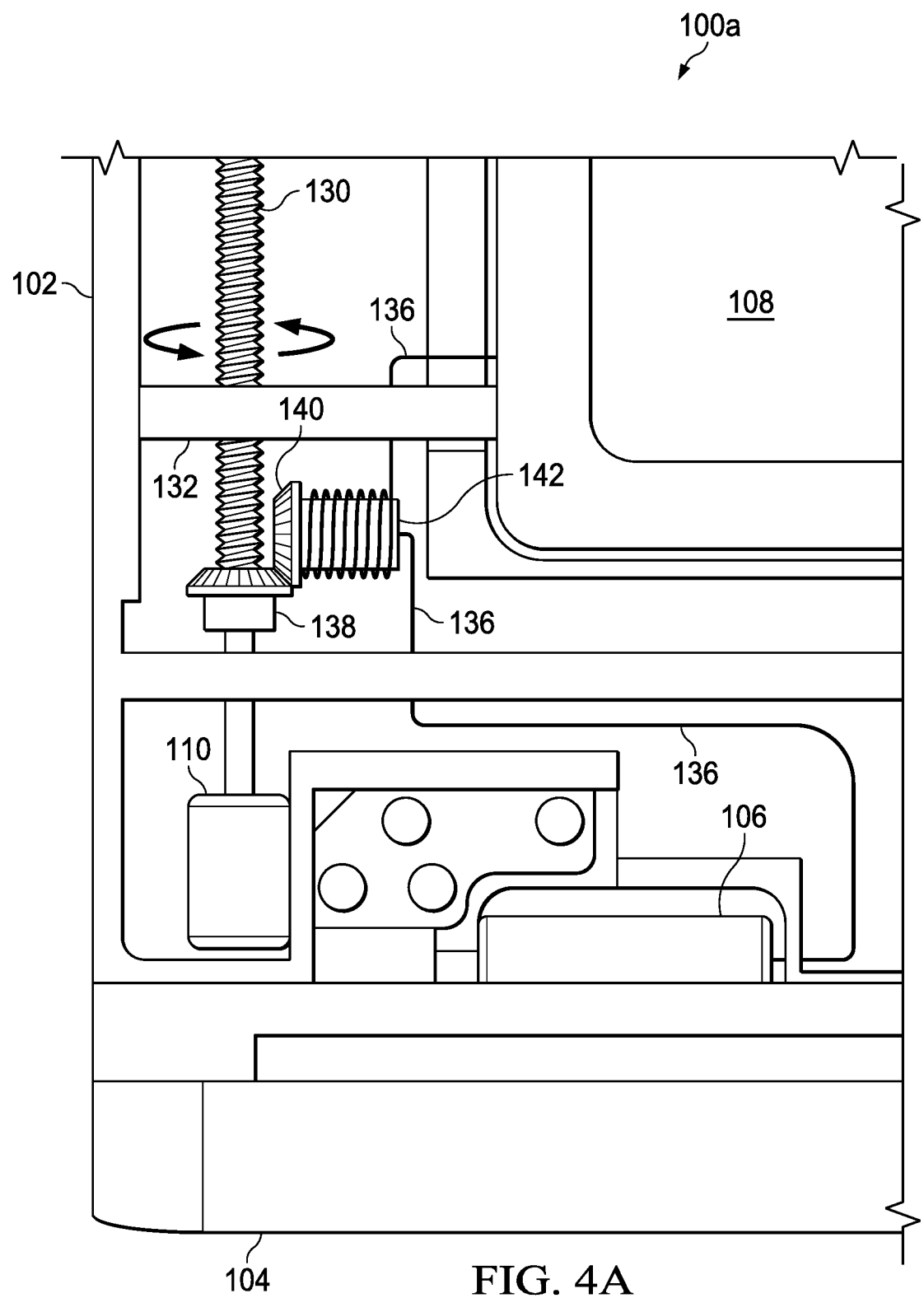
FIG. 4A is a simplified block diagram of a portion of a system to enable a display adjustment system, in accordance with an embodiment of the present disclosure.

Turning to FIG. 4A, FIG. 4A is a simplified block diagram of an electronic device 100a configured to include a display adjustment system. In an example, first housing 102 can include display 108, motor 110, worm gear 130, electrical connection 136, a first portion of beveled gear 138, a second portion of beveled gear 140, and an electrical connection spool 142. Electrical connection 136 can be a cable, wire, wire cable, etc. that allows electrical signals and power to be communicated between display 108 and second housing 104 through hinge 106.

First portion of beveled gear 138 can be in contact with worm gear 130 such that when motor 110 causes worm gear 130 to rotate in a first direction or in an opposite a second direction, first portion of beveled gear 138 also rotates in the first direction or in the opposite section direction. Second portion of beveled gear 140 can be in contact with first portion of beveled gear 138 and coupled to electrical connection spool 142. When first portion of beveled gear 138 rotates in the first direction or in the opposite section direction, second portion of beveled gear 140 will rotate in a corresponding direction and wind or unwind electrical connection 136 from electrical connection spool 142.

Figure 4B:
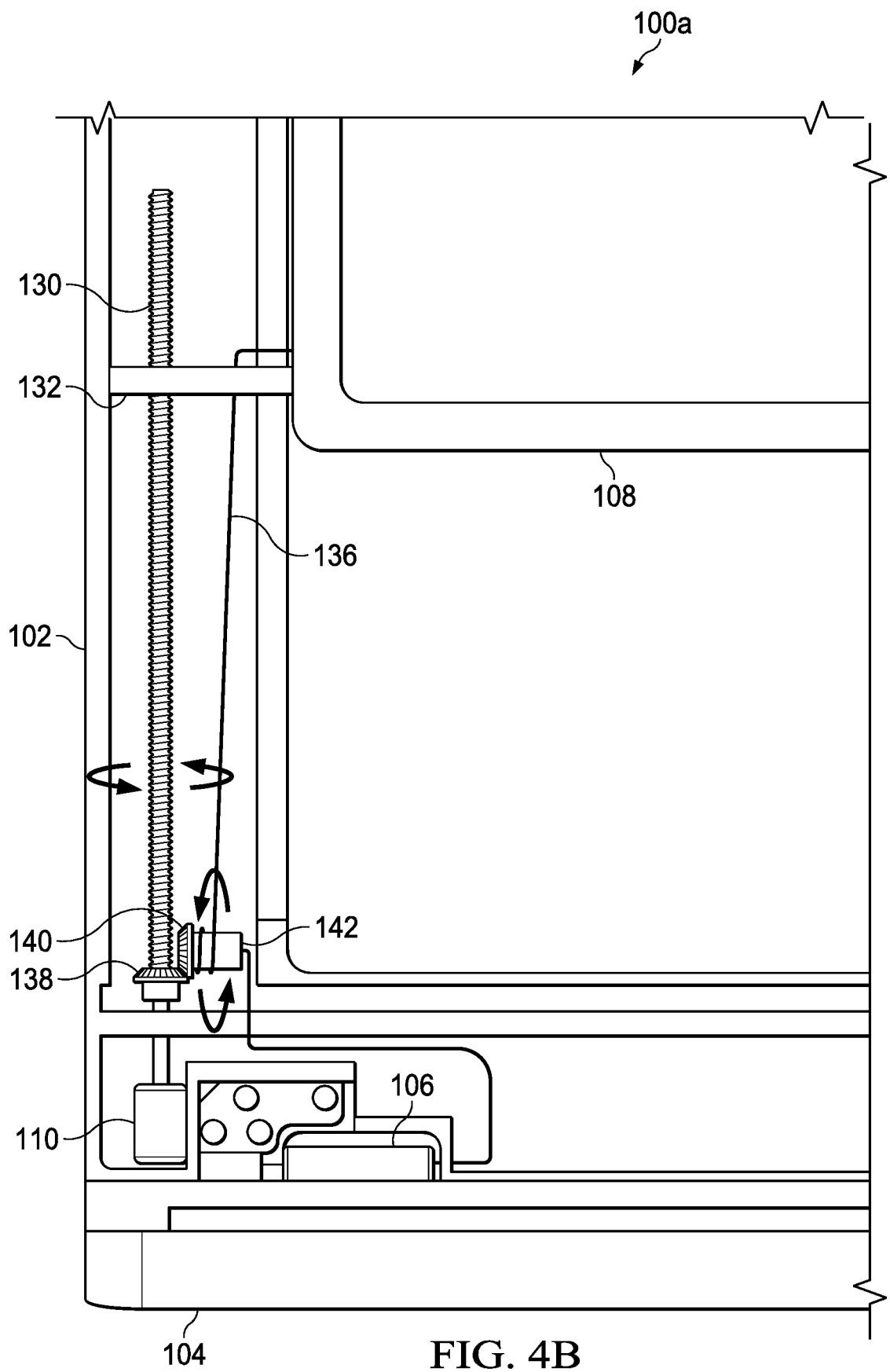
FIG. 4B is a simplified block diagram of a portion of a system to enable a display adjustment system, in accordance with an embodiment of the present disclosure.

Turning to FIG. 4B, FIG. 4B is a simplified block diagram of electronic device 100a configured to include a display adjustment system. In an example, motor 110 has rotated worm gear 130 causing display support 132 to travel up worm gear 130 and raise display 108. In addition, motor 110 (rotating worm gear 130) causes first portion of beveled gear 138 to rotate. The rotation of first portion of beveled gear 138 causes second portion of beveled gear 140 to rotate and, because second portion of beveled gear 140 is coupled to electrical connection spool 142, electrical connection spool 142 rotates. The rotation of electrical connection spool 142 allows electrical connection 136 to unwind from electrical connection spool 142 and electrical connection 136 can extend to travel with display 108 as display 108 is raised.

When display is lowered (as illustrated in FIG. 4A), motor 110 rotates worm gear 130 causing display support 132 to travel down worm gear 130 and lower display 108. In addition, motor 110 (rotating worm gear 130) causes first portion of beveled gear 138 to rotate in the opposite direction first portion of beveled gear 138 rotated when display 108 was raised. The rotation of first portion of beveled gear 138 causes second portion of beveled gear 140 to also rotate in the opposite direction second portion of beveled gear 140 rotated when display 108 was raised. Because second portion of beveled gear 140 is coupled to electrical connection spool 142, electrical connection spool 142 also rotates in the opposite direction electrical connection spool 142 rotated when display 108 was raised. The rotation of electrical connection spool 142 allows electrical connection 136 to wind around electrical connection spool 142.

Figure 5A:
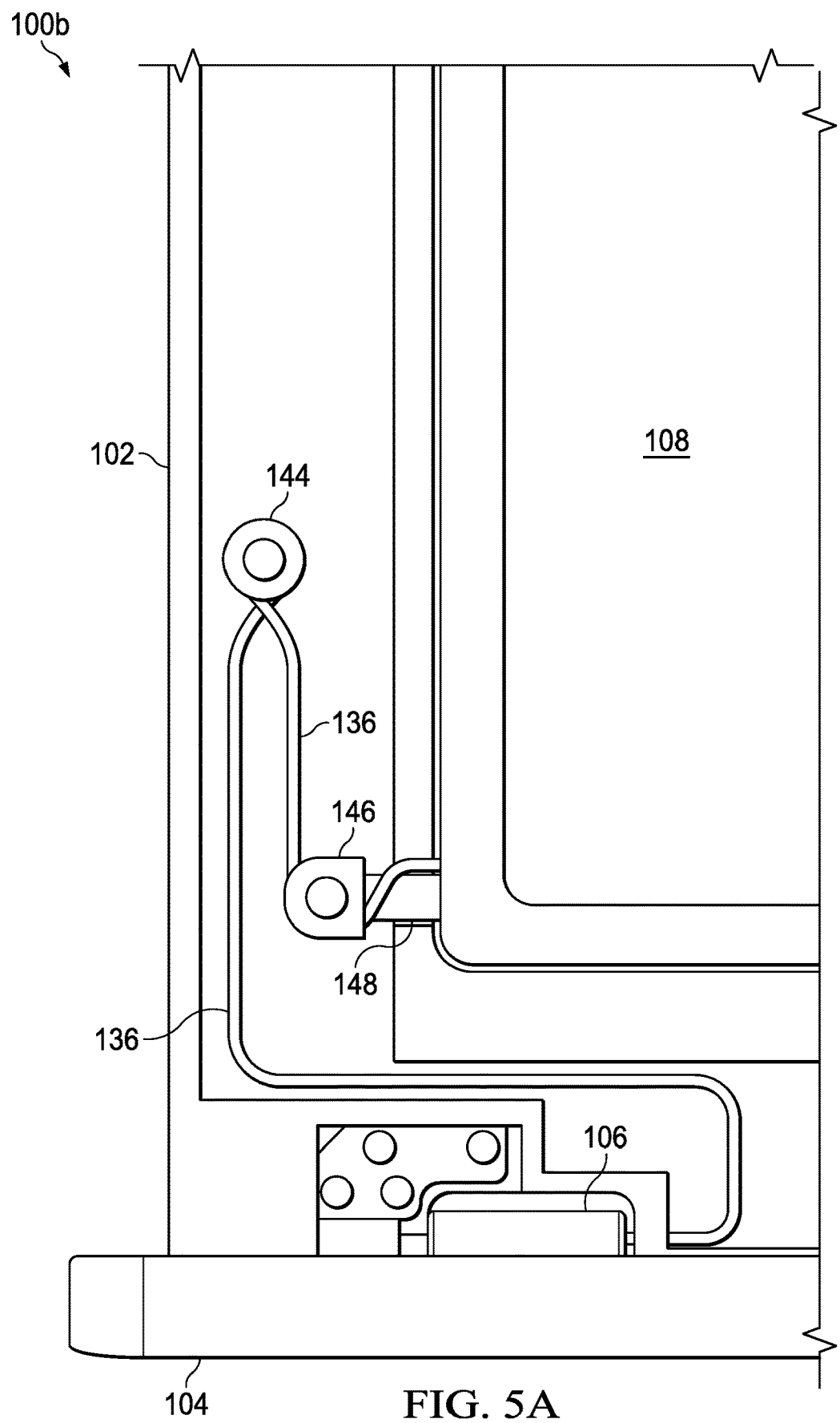
FIG. 5A is a simplified block diagram of a portion of a system to enable a display adjustment system, in accordance with an embodiment of the present disclosure.

Turning to FIG. 5A, FIG. 5A is a simplified block diagram of an electronic device 100b configured to include a display adjustment system. In an example, first housing 102 can include display 108, electrical connection 136, a fixed roller 144, a display roller 146, and a display roller arm 148. The mechanism to raise and lower display 108 is not shown (e.g., motor 110, worm gear 130, ect.).

Fixed roller 144 can be located in first housing 102 at about a middle point (or about half) of the total distance display 108 can be raised and lowered (i.e., at the middle point between where display 108 is raised to its highest point and where display 108 is lowered to its lowest point). Electrical connection 136 can extend from hinge 106 to fixed roller 144. Electrical connection 136 can be securely coupled to fixed roller 144 and extend to and be securely coupled to display roller 146. From display roller 146, electrical connection 136 can be coupled to display 108 to provide an electrical connection and power to display 108.

Figure 5B:
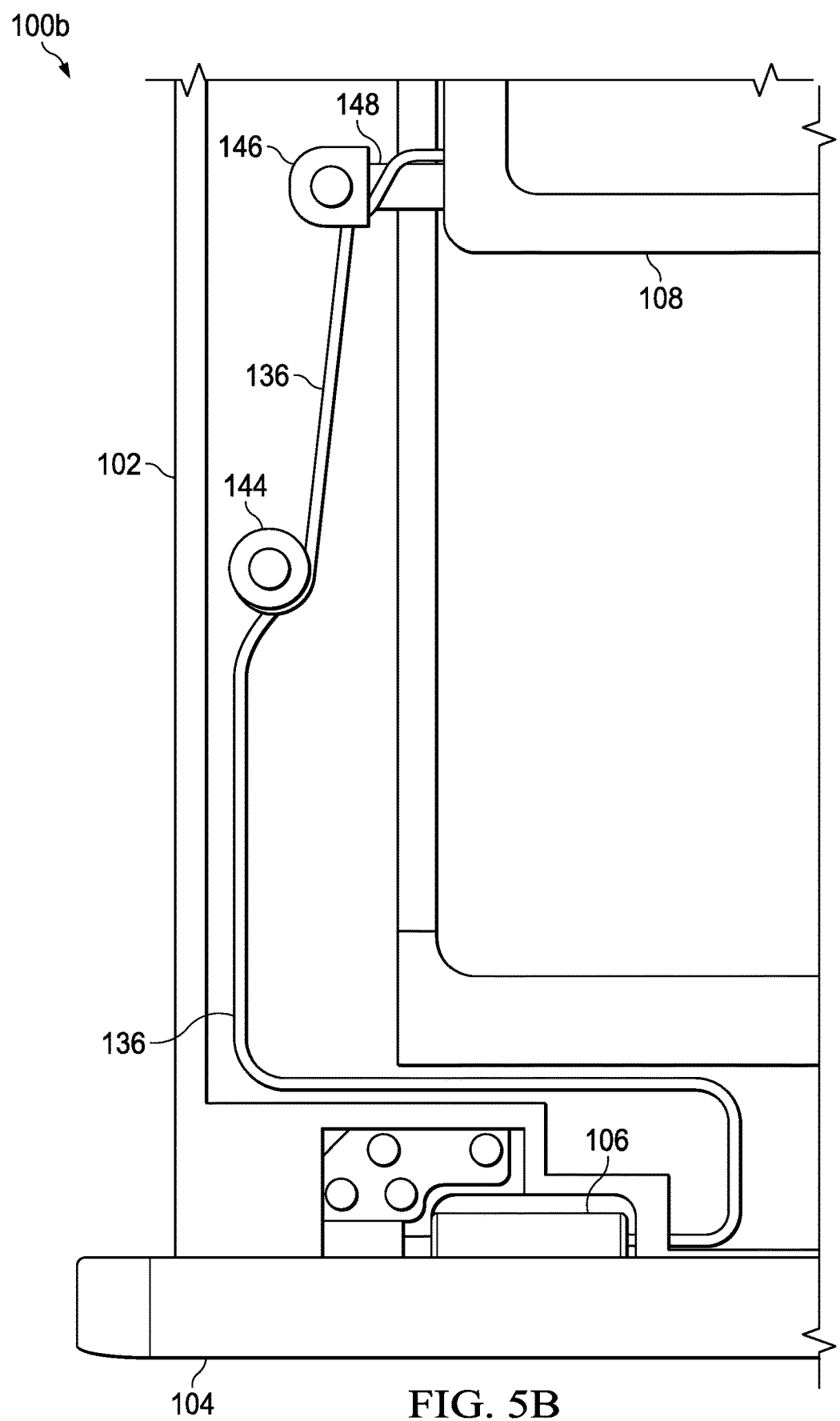
FIG. 5B is a simplified block diagram of a portion of a system to enable a display adjustment system, in accordance with an embodiment of the present disclosure.

Turning to FIG. 5B, FIG. 5B is a simplified block diagram of electronic device 100b configured to include a display adjustment system. In an example, display 108 has been raised from the position shown in FIG. 5A. When display 108 is raised, electrical connection 136, display roller 146 and display roller arm 148 travel with display 108 as display 108 is raised. Electrical connection 136 remains securely coupled to fixed roller 144 and display roller 146 and continues to provide an electrical connection and power to display 108.

Figure 6A:
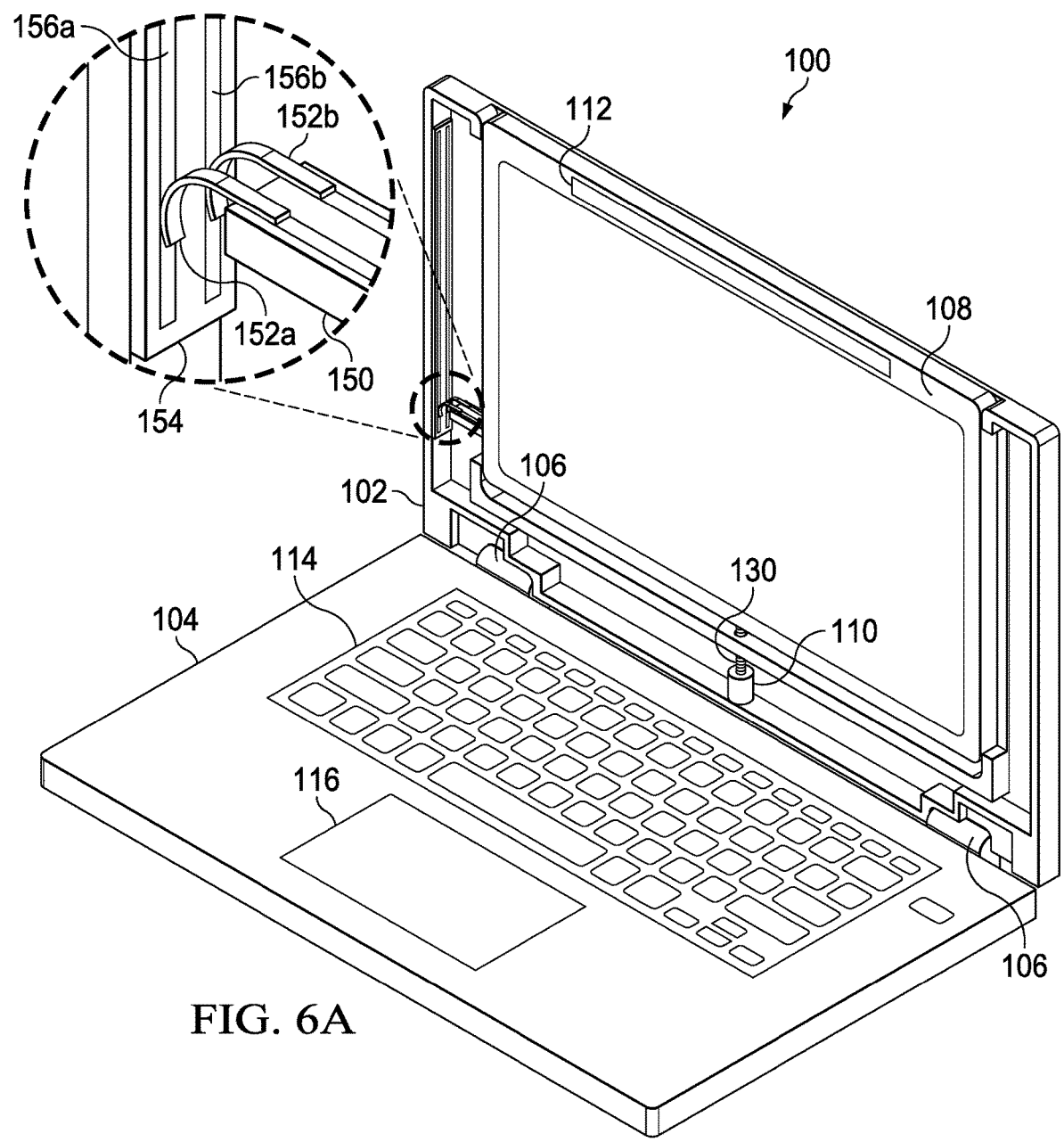
FIG. 6A is a simplified block diagram of a portion of a system to enable a display adjustment system, in accordance with an embodiment of the present disclosure.

Turning to FIG. 6A, FIG. 6A is a simplified block diagram of an electronic device configured to include a display adjustment system. In an example, first housing 102c can include display 108, motor 110 (not shown), user tracking engine 112, worm gear 130 (not shown), display support arm 150, one or more spring clips 152a and 152b, track 154, and one or more conductive paths 156a and 156b. Each of one or more spring clips 152a and 152b can be located on an end of display support arm 150. Each of one or more conductive paths 156a and 156b can be located along track 154 such that as display 108, display support arm 150, and one or more spring clips 152a and 152b travel up and down, each of one or more spring clips 152a and 152b are in electrical contact with a corresponding conductive path. For example, as display 108, display support arm 150, and one or more spring clips 152a and 152b travel up and down, spring clip 152a is in electrical contact with conductive path 156a and spring clip 152b is in electrical contact with conductive path 156b.

Figure 6B:
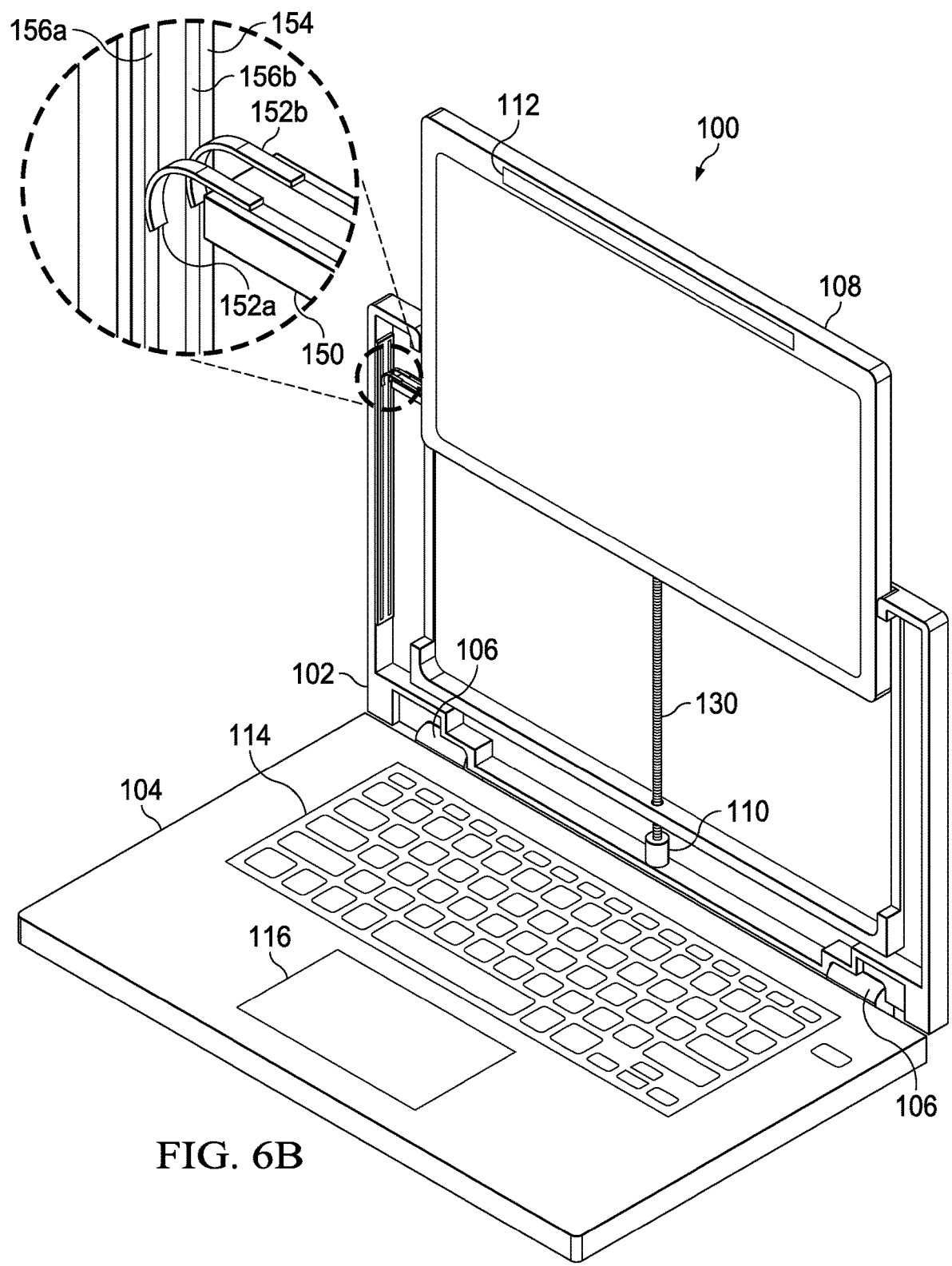
FIG. 6B is a simplified block diagram of a portion of a system to enable a display adjustment system, in accordance with an embodiment of the present disclosure.

Turning to FIG. 6B, FIG. 6B is a simplified block diagram of an electronic device configured to include a display adjustment system. In an example, motor 110 was activated and rotated worm gear 130 and raised display 108 from the position illustrated in FIG. 6A. As display 108 was raised, each of one or more spring clips 152a and 152b were also raised with display 108. Each of one or more spring clips 152a and 152b traveled along a corresponding conductive path (e.g., spring clip 152a traveled along conductive path 156a and spring clip 152b traveled along conductive path 156b) and maintained an electrical contact with a corresponding conductive path.

Figure 7A:
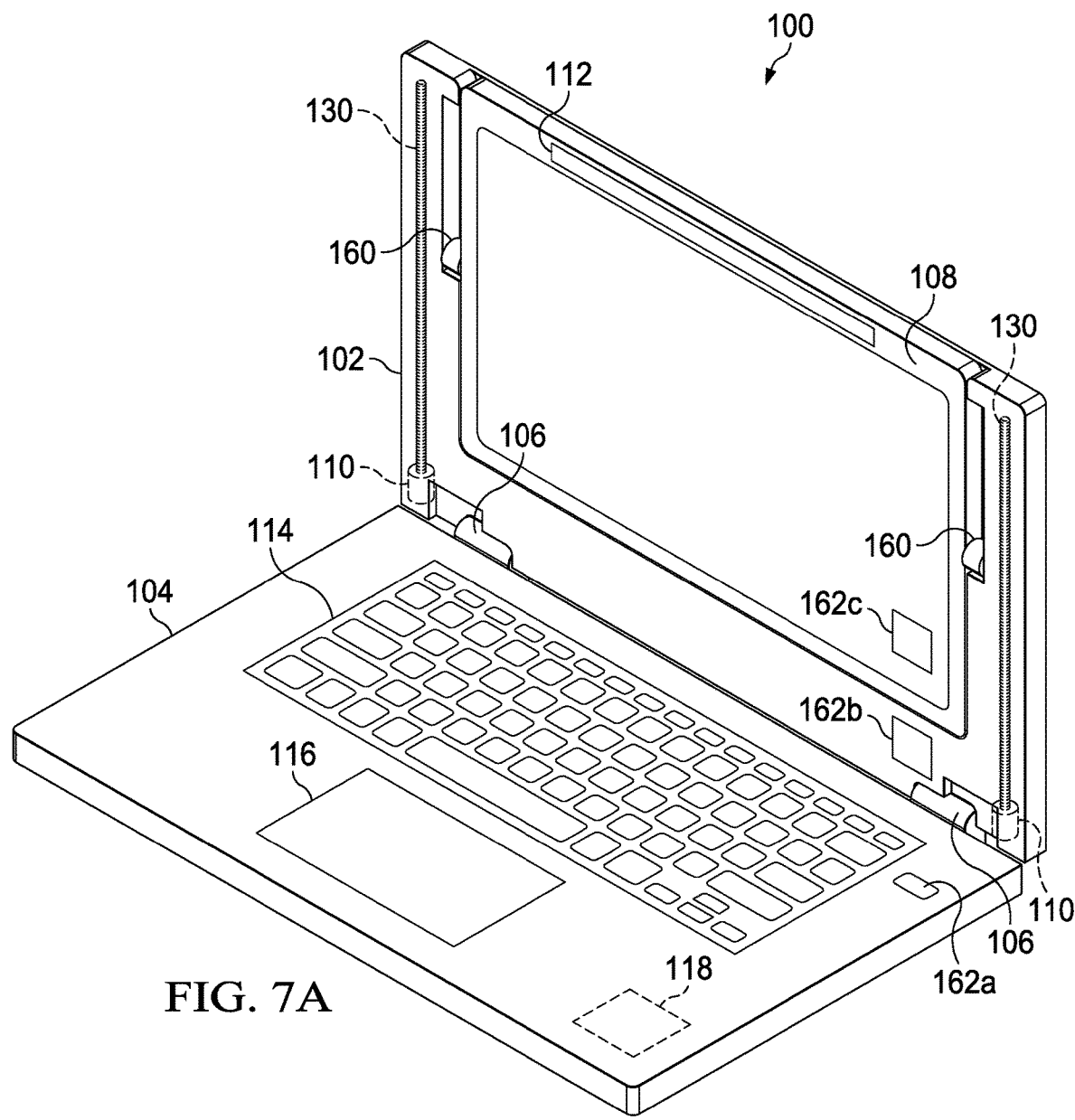
FIG. 7A is a simplified block diagram of a portion of a system to enable a display adjustment system, in accordance with an embodiment of the present disclosure.

Turning to FIG. 7A, FIG. 7A, is a simplified block diagram of an electronic device configured to include a display adjustment system. In an example, first housing 102d can include display 108, motor 110, user tracking engine 112, display adjustment engine 118, worm gear 130, a display rotation mechanism 160, and user activated display adjustment 162a-162c. Display rotation mechanism 160 can be coupled to worm gear 130 such that motor 110 can activate worm gear 130 to raise or lower display rotation mechanism 160 and in turn, raise or lower display 108. One or more of user activated display adjustments 162a-162c may be present and each of user activated display adjustments 162a-162c can be used by a user to manually adjust the position of display 108 (e.g., to raise or lower display 108 and/or to rotate display 108 forward or back relative to the user).

Figure 7B:
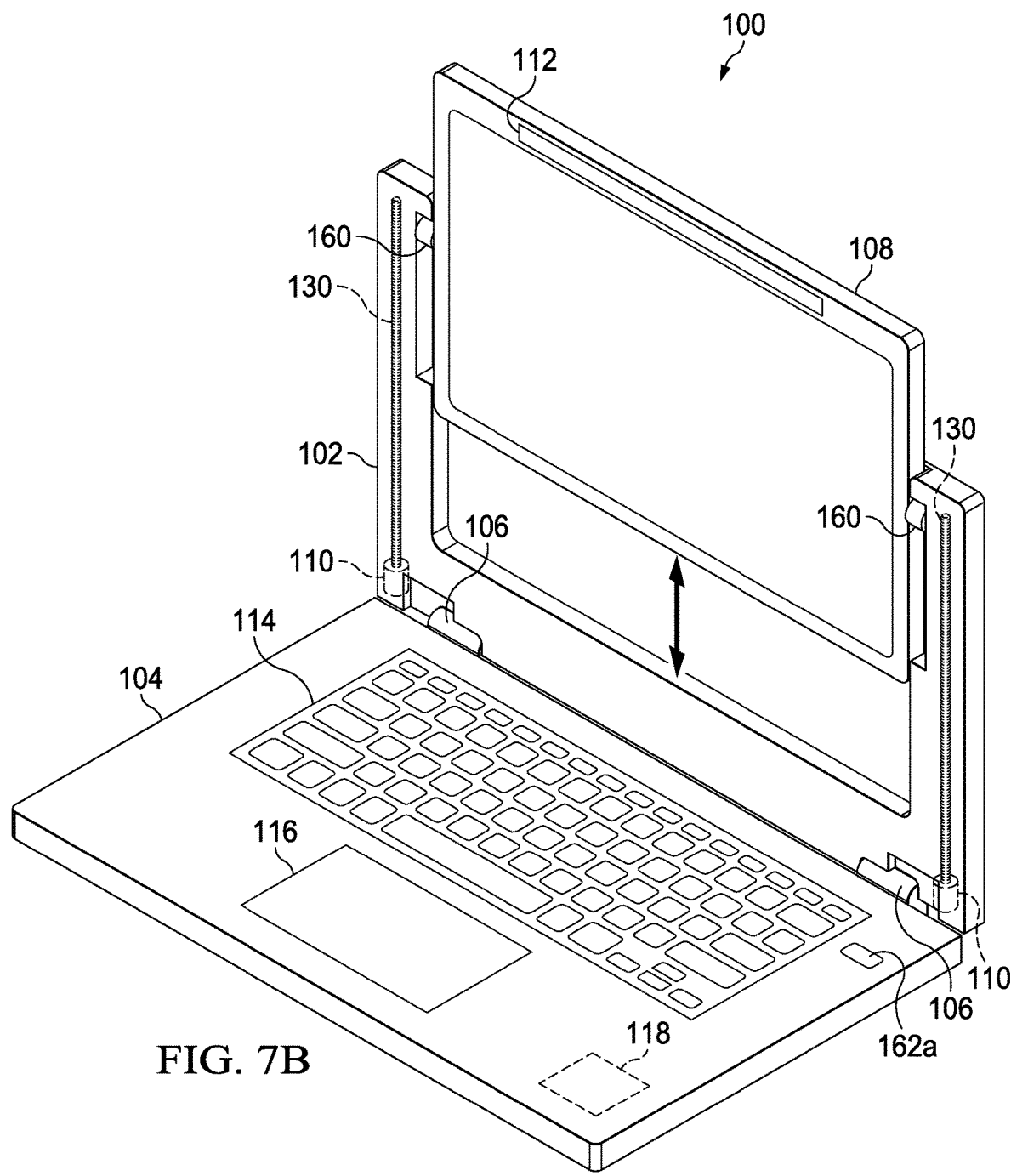
FIG. 7B is a simplified block diagram of a portion of a system to enable a display adjustment system, in accordance with an embodiment of the present disclosure.

Turning to FIG. 7B, FIG. 7B illustrates where motor 110 activated worm gear 130 to raise display rotation mechanism 160 and in turn, raise display 108. In an example, display adjustment engine 118 determined that display 108 should be raised from the position illustrated in FIG. 7A to the position illustrated in FIG. 7B. Display adjustment engine 118 can activate motor 110 to rotate worm gear 130. The rotation of worm gear 130 causes display rotation mechanism 160 to travel up worm gear 130. As display rotation mechanism 160 moves up worm gear 130, display 108 can correspondingly be raised to the position illustrated in FIG. 7B. In addition, display adjustment engine 118 can determine if display 108 should be rotated and if display 108 should be rotated, display adjustment engine 118 can activate display rotation mechanism 160 to rotate display 108.

Figure 8A:
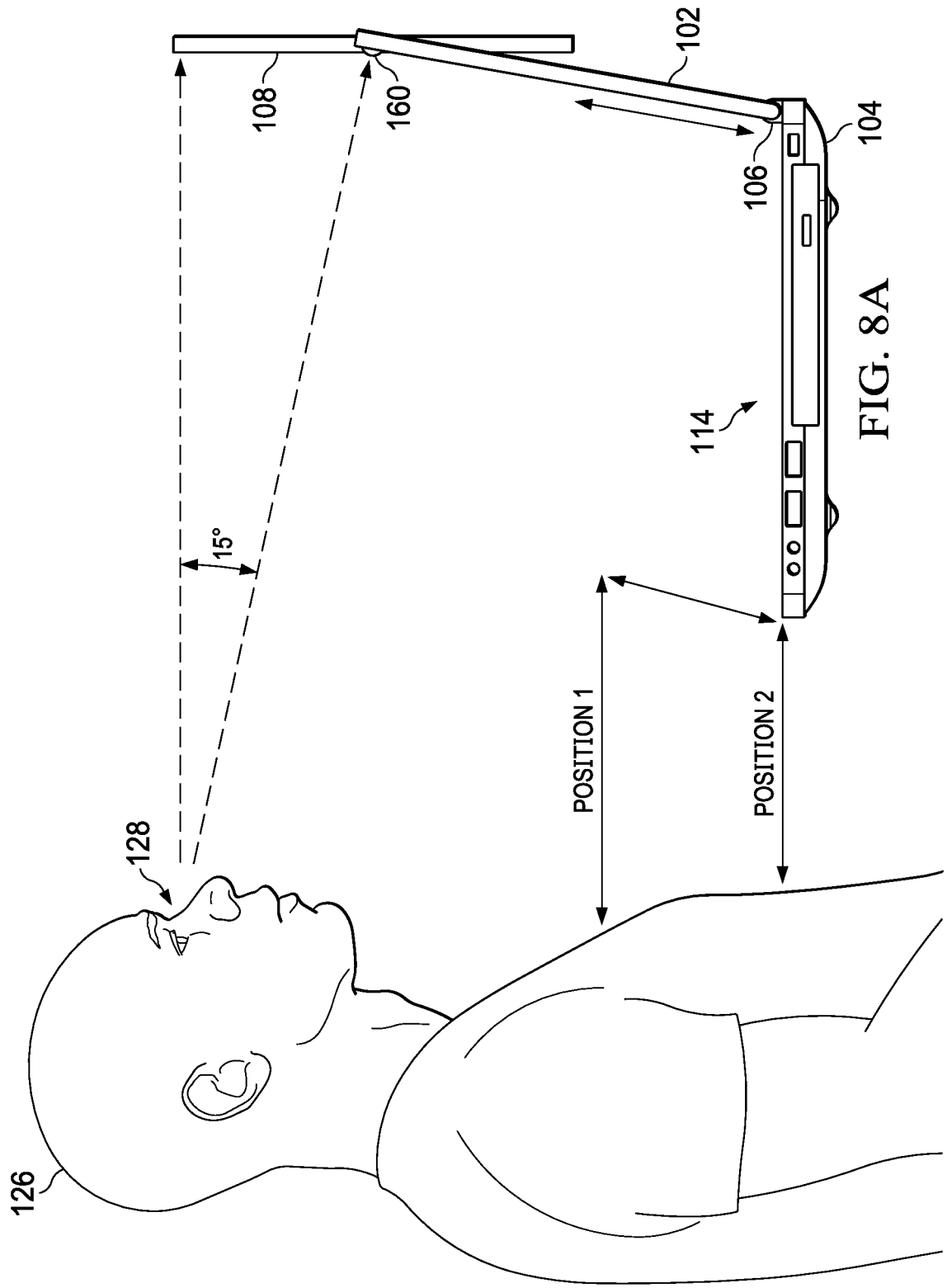
FIG. 8A is a simplified block diagram of a portion of a system to enable a display adjustment system, in accordance with an embodiment of the present disclosure.

Turning to FIG. 8A, FIG. 8A, is a simplified block diagram of an electronic device configured to include a display adjustment system. Elevating display 108 results in user 126 being able to position the keyboard in second housing 104 lower to user 126 (position 2 versus position 1). However, an issue can exist where the top and bottom of display 108 are at different distances from the user's eyes.

Display rotation mechanism 160 can allow display 108 to pivot and allow additional orientation of display 108. Display rotation mechanism 160 can be configured to rotate display 108 at any elevation, allowing the top and bottom of display 108 to be about equidistant from eyes 128 of user 126. Display rotation mechanism 160 may be an active pivot with a motor directly connected to either side of display 108. Display rotation mechanism 160 may use motors (e.g., positioned near display rotation mechanism 160) that use cables to reorient the display about its pivot points (passive pivots). In an example, display rotation mechanism 160 includes an electrical connection to display adjustment engine 118 and one or more motors that can rotate display 108.

Figure 8B:
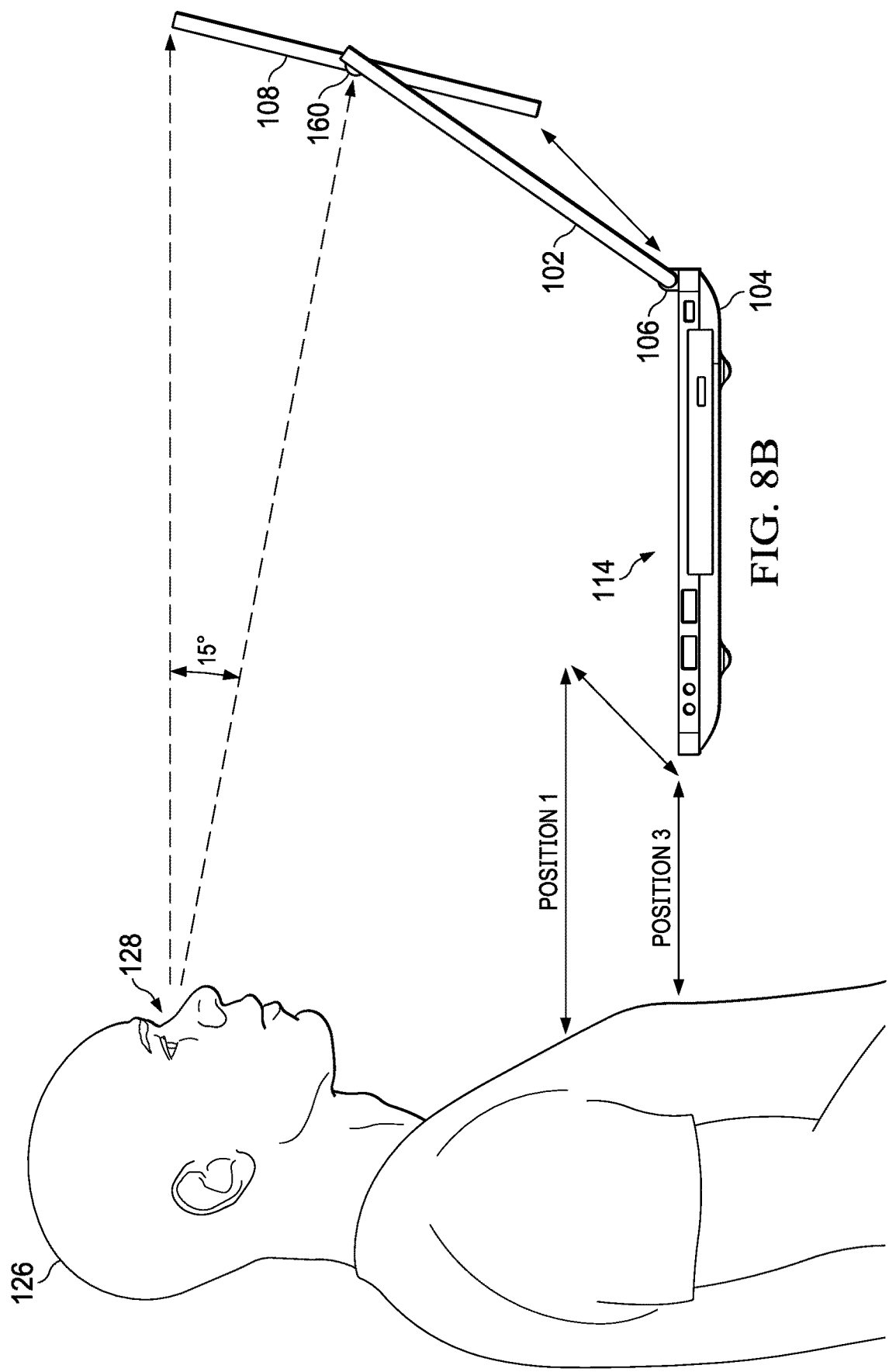
FIG. 8B is a simplified block diagram of a portion of a system to enable a display adjustment system, in accordance with an embodiment of the present disclosure.

Turning to FIG. 8B, FIG. 8B, is a simplified block diagram of an electronic device configured to include a display adjustment system. As illustrated in FIG. 8B, second housing 104 may be positioned relatively close to user 126 while first housing 102 is positioned relatively far away from user 126. Hinge 106 can allow second housing 104 to be positioned relatively close to user 126 and first housing 102 to be positioned relatively far away from user 126 by rotating first housing 102 on hinge 106 away from user 126. When first housing 102 is rotated on hinge 106 away from user 126, display rotation mechanism 160 can rotate display 108, allowing the top and bottom of display 108 to be about equidistant from eyes 128 of user 126.

Turning to FIG. 8C, FIG. 8C, is a simplified block diagram of an electronic device configured to include a display adjustment system. As illustrated in FIG. 8C, second housing 104 may be positioned relatively far away from user 126 and first housing 102 is positioned relatively close to user 126. Hinge 106 can allow second housing 104 to be positioned relatively far away from user 126 and first housing 102 to be positioned relatively close to user 126 by rotating first housing 102 on hinge 106 towards user 126. When first housing 102 is rotated on hinge 106 towards user 126, display rotation mechanism 160 can rotate display 108, allowing the top and bottom of display 108 to be about equidistant from eyes 128 of user 126.

Figure 9:
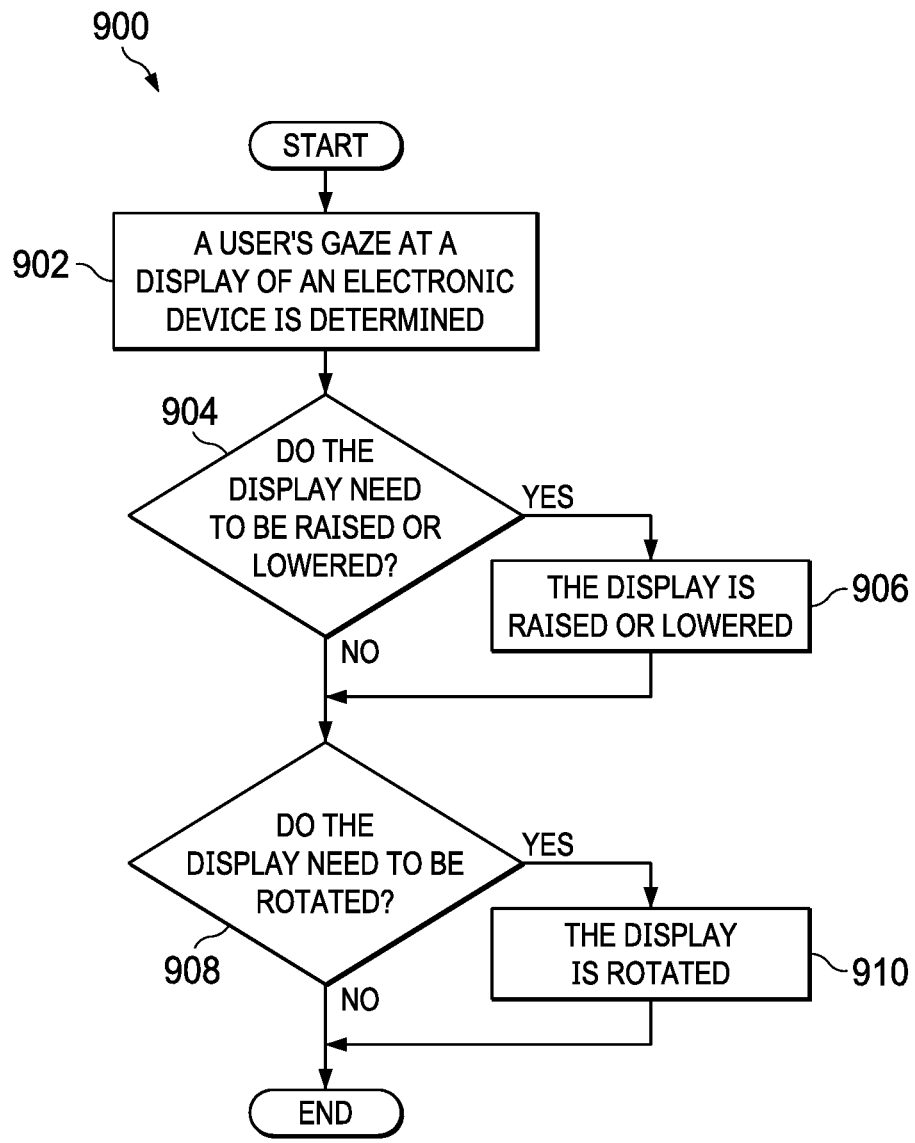
FIG. 9 is a simplified flowchart illustrating potential operations that may be associated with the system in accordance with an embodiment.

Turning to FIG. 9, FIG. 9 is an example flowchart illustrating possible operations of a flow 900 that may be associated with enabling a display adjustment system, in accordance with an embodiment. In an embodiment, one or more operations of flow 900 may be performed by user tracking engine 112 or display adjustment engine 118. At 902, a user's gaze at a display of an electronic device is determined. At 904, the system determines if the display needs to be raised or lowered. If the system determines that the display needs to be raised or lowered, then the display is raised or lowered, as in 906. For example, if the system determines that the display needs to be raised, then the motor can activate a worm gear to rotate in a first direction and cause the display to be raised and if the system determines that the display needs to be lowered, then a motor can activate a worm gear to rotate in a second direction (opposite the first direction) and cause the display to be lowered. If the display does not need to be raised or lowered, then the system determines if the display needs to be rotated, as in 908. If the system determines that the display needs to be rotated, then the display is rotated, as in 910. For example, if the system determines that the display needs to be rotated in a first rotation direction, then a motor can activate a display rotation mechanism to rotate the display such that a bottom portion of the display is rotated towards the user and if the system determines that the display needs to be rotated in an opposite second rotation direction, then the motor can activate the display rotation mechanism to rotate the display such that the bottom portion of the display is rotated away from the user. In an example, the system can return to 902 where the gaze of the user is again determined.

It is also important to note that the operations described above and in the preceding flow diagram (i.e., FIG. 9) illustrate only some of the possible correlating scenarios that may be executed by, or within, electronic device 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic device 100 in that any suitable arrangements, chronologies, configurations, and mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic device 100 has been illustrated with reference to particular elements and operations that facilitate a display adjustment system, these elements and operations may be replaced by any suitable architecture, protocols, and/or processes that achieve the intended functionality of electronic device 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims;

and (b) does not intend, by any statement in the specification, to limit this disclosure in any way that is not otherwise reflected in the appended claims.

OTHER NOTES AND EXAMPLES

In Example A1, an electronic device can include a first housing, where the first housing includes a display, a second housing, where the second housing is rotatably coupled to the first housing using a hinge, a user tracking engine to determine a gaze of a user, a display adjustment engine, and a motor, where, based on data related to the gaze of the user, the display adjustment engine can activate the motor to cause a height of the display to be adjusted.

In Example A2, the subject matter of Example A1 can optionally include where the gaze is a relative distance of a user's face and eyes from the display, a position of the user's eyes relative to the display, an orientation of the user's pupil relative to the display, and/or a position of the user's head relative to the display.

In Example A3, the subject matter of any one of Examples A1-A2 can optionally include a display rotation mechanism, where, based on the data related to the gaze of the user, the display adjustment engine can activate the display rotation mechanism to rotate the display.

In Example A4, the subject matter of any one of Examples A1-A3 can optionally include where the motor rotates a worm gear in a first direction and a display support travels up the worm gear as the worm gear rotates in the first direction, where the display support is coupled to the display.

In Example A5, the subject matter of any one of Examples A1-A4 can optionally include where the motor rotates the worm gear in a second direction and the display support travels down the worm gear as the worm gear rotates in the second direction, where the second direction is opposite the first direction.

In Example A6, the subject matter of any one of Examples A1-A5 can optionally include where the display is electrically coupled to the second housing using a wire cable and a spool winds or unwinds the wire cable when the display is adjusted.

In Example A7, the subject matter of any one of Examples A1-A6 can optionally include where the spool is coupled to the worm gear.

In Example A8, the subject matter of any one of Examples A1-A7 can optionally include where the display is electrically coupled to the second housing through the hinge Example M1 is a method including receiving data related to a gaze of a user, determining that a display should be adjusted based on the received data related to the gaze of the user, and activating a motor, where in the motor causes a height of the display to be adjusted.

In Example M2, the subject matter of Example M1 can optionally include determining that the display should be rotated based on the received data related to the gaze of the user and rotating the display.

In Example M3, the subject matter of any one of the Examples M1-M2 can optionally include where the motor rotates a worm gear in a first direction and a display support travels up the worm gear as the worm gear rotates in the first direction, where the display support is coupled to the display.

In Example M4, the subject matter of any one of the Examples M1-M3 can optionally include where the motor rotates the worm gear in a second direction and the display support travels down the worm gear as the worm gear rotates in the second direction, where the second direction is opposite the first direction.

In Example M5, the subject matter of any one of the Examples M1-M4 can optionally include where the display is located in a first housing, where a hinge rotatably couples the first housing to a second housing, where the display is electrically coupled to the second housing through the hinge.

In Example M6, the subject matter of any one of the Examples M1-M5 can optionally include where the display is electrically coupled to the second housing using a wire cable, where a spool, coupled to the worm gear, winds or unwinds the wire cable when the display is adjusted.

Example C1 is at least one machine readable storage medium having one or more instructions that when executed by at least one processor, cause the at least one processor to receive data related to a gaze of a user, where the gaze is a relative distance of the user's face and eyes from a display, a position of the user's eyes relative to the display, an orientation of the user's pupil relative to the display, and/or a position of the user's head relative to the display, determine that the display should be adjusted based on the received data related to the gaze of the user, and activate a motor, where in the motor causes a height of the display to be adjusted.

In Example C2, the subject matter of Example C1 can optionally include where the one or more instructions further cause the at least one processor to determine that the display should be rotated based on the received data related to the gaze of the user and rotate the display.

In Example C3, the subject matter of any one of Examples C1-C2 can optionally include where the motor turns a worm gear and a display support travels up when the worm gear rotates in a first direction and down when the worm gear rotates in a second direction, where the display support is coupled to the display.

In Example C4, the subject matter of any one of Examples C1-C3 can optionally include where the display is located in a first housing and the display is electrically coupled to a second housing using a wire cable, where a spool winds or unwinds the wire cable when the display is adjusted.

In Example C5, the subject matter of any one of Examples C1-C4 can optionally include where the spool is coupled to the worm gear.

In Example C6, the subject matter of any one of Examples C1-05 can optionally include where the display is located in a first housing and the display is electrically coupled to a second housing using spring clips.

Example S1 is a system for a reversible direction thermal cooling system. The system can include memory, a first housing, a second housing, a display, and a display adjustment engine. The display adjustment engine is configured to receive data related to a gaze of a user, where the gaze is a relative distance of the user's face and eyes from a display, a position of the user's eyes relative to the display, an orientation of the user's pupil relative to the display, and/or a position of the user's head relative to the display, determine that the display should be adjusted based on the received data related to the gaze of the user, and activate a motor, where in the motor causes a height of the display to be adjusted.

In Example S2, the subject matter of Example S1 can optionally include where the display adjustment engine is configured to determine that the display should be rotated based on the received data related to the gaze of the user and rotate the display.

In Example S3, the subject matter of any one of the Examples S1-S2 can optionally include where the motor turns a worm gear and a display support travels up when the worm gear rotates in a first direction and down when the worm gear rotates in a second direction, where the display support is coupled to the display.

In Example S4, the subject matter of any one of the Examples S1-S3 can optionally include where the display is located in a first housing and the display is electrically coupled to a second housing using a wire cable, where a spool winds or unwinds the wire cable when the display is adjusted.

In Example S5, the subject matter of any one of the Examples S1-S4 can optionally include where the spool is coupled to the worm gear.

In Example S6, the subject matter of any one of the Examples S1-S5 can optionally include where the display is located in a first housing and the display is electrically coupled to a second housing using spring clips.

Example AA1 is an apparatus including means for receiving data related to a gaze of a user, means for determining that a display should be adjusted based on the received data related to the gaze of the user, and means for activating a motor, where in the motor causes a height of the display to be adjusted.

In Example AA2, the subject matter of Example AA1 can optionally include means for determining that the display should be rotated based on the received data related to the gaze of the user and rotating the display.

In Example AA3, the subject matter of any one of Examples AA1-AA2 can optionally include where the motor rotates a worm gear in a first direction and a display support travels up the worm gear as the worm gear rotates in the first direction, where the display support is coupled to the display.

In Example AA4, the subject matter of any one of Examples AA1-AA3 can optionally include where the motor rotates the worm gear in a second direction and the display support travels down the worm gear as the worm gear rotates in the second direction, where the second direction is opposite the first direction.

In Example AA5, the subject matter of any one of Examples AA1-AA4 can optionally include where the display is located in a first housing, where a hinge rotatably couples the first housing to a second housing, where the display is electrically coupled to the second housing through the hinge.

In Example AA6, the subject matter of any one of Examples AA1-AA5 can optionally include where the display is electrically coupled to the second housing using a wire cable, where a spool, coupled to the worm gear, winds or unwinds the wire cable when the display is adjusted.

In Example AA7, the subject matter of any one of Examples AA1-AA6 can optionally include where the display is located in a first housing and the display is electrically coupled to a second housing using spring clips.

Example X1 is a machine-readable storage medium including machine-readable instructions to implement a method or realize an apparatus as in any one of the Examples A1-A8, AA1-AA7, or M1-M6. Example Y1 is an apparatus comprising means for performing any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device comprising:
   a first housing, wherein the first housing includes a display having a top portion, a bottom portion, a right side, and a left side;
   a second housing, wherein the second housing is rotatably coupled to the first housing using a hinge;
   a user tracking engine located in the display to at least partially determine data related to a gaze of a user;
   a display adjustment engine;
   a motor, wherein, based on the data related to the gaze of the user, the display adjustment engine can activate the motor to cause a height of the display to be adjusted; and
   a display rotation mechanism, wherein the display rotation mechanism is located in a middle portion of at least one of the right side or the left side of the display, wherein the display adjustment engine can use the display rotation mechanism to cause the display to be rotated such that the top portion of the display and the bottom portion of the display are equidistant from eyes of the user.

2. The electronic device of claim 1, wherein the gaze is a relative distance of a user's face and the eyes from the display, a position of the user's eyes relative to the display, an orientation of the user's pupil relative to the display, and/or a position of the user's head relative to the display.

3. The electronic device of claim 1, wherein the motor rotates a worm gear in a first direction and a display support travels up the worm gear as the worm gear rotates in the first direction, wherein the display support is coupled to the display.

4. The electronic device of claim 3, wherein the motor rotates the worm gear in a second direction and the display support travels down the worm gear as the worm gear rotates in the second direction, wherein the second direction is opposite the first direction.

5. The electronic device of claim 3, wherein the display is electrically coupled to the second housing using a wire cable and a spool winds or unwinds the wire cable when the display is adjusted.

6. The electronic device of claim 5, wherein the spool is coupled to the worm gear.

7. The electronic device of claim 1, wherein the display is electrically coupled to the second housing through the hinge.

8. A method comprising:
   receiving data related to a gaze of a user from a user tracking engine located in a display that includes a top portion, a bottom portion, a right side, and a left side;
   determining that the display should be adjusted based on the received data related to the gaze of the user;
   activating a motor, where in the motor causes a height of the display to be adjusted; and
   rotating the display by activating a display rotation mechanism located along a middle portion of at least one of the right side or the left side of the display.

9. The method of claim 8, wherein the display is rotated such that a top portion of the display and a bottom portion of the display are about equidistant from eyes of the user.

10. The method of claim 8, wherein the motor rotates a worm gear in a first direction and a display support travels up the worm gear as the worm gear rotates in the first direction, wherein the display support is coupled to the display.

11. The method of claim 10, wherein the motor rotates the worm gear in a second direction and the display support travels down the worm gear as the worm gear rotates in the second direction, wherein the second direction is opposite the first direction.

12. The method of claim 10, wherein the display is located in a first housing, wherein a hinge rotatably couples the first housing to a second housing, wherein the display is electrically coupled to the second housing through the hinge.

13. The method of claim 12, wherein the display is electrically coupled to the second housing using a wire cable, wherein a spool, coupled to the worm gear, winds or unwinds the wire cable when the display is adjusted.

14. At least one non-transitory machine readable medium comprising one or more instructions that, when executed by at least one processor, causes the at least one processor to:
  receive data related to a gaze of a user from a user tracking engine located in a display that has a top portion, a bottom portion, a right side, and a left side, wherein the gaze is a relative distance of the user's face and eyes from the display, a position of the user's eyes relative to the display, an orientation of the user's pupil relative to the display, and/or a position of the user's head relative to the display;
  determine that the display should be adjusted based on the received data related to the gaze of the user;
  activate a motor, where in the motor causes a height of the display to be adjusted; and
  activate a display rotation mechanism to cause the display to be rotated such that a top portion of the display and a bottom portion of the display are equidistant from eyes of the user, wherein the display rotation mechanism is located in a middle portion of at least one of the right side or the left side of the display.

15. The at least one non-transitory machine readable medium of claim 14, wherein the motor turns a worm gear and a display support travels up when the worm gear rotates in a first direction and down when the worm gear rotates in a second direction, wherein the display support is coupled to the display.

16. The at least one non-transitory machine readable medium of claim 15, wherein the display is located in a first housing and the display is electrically coupled to a second housing using a wire cable, wherein a spool winds or unwinds the wire cable when the display is adjusted.

17. The at least one non-transitory machine readable medium of claim 16, wherein the spool is coupled to the worm gear.

18. The at least one non-transitory machine readable medium of claim 14, wherein the display is located in a first housing and the display is electrically coupled to a second housing using spring clips.

* * * * *